United States Patent
Aue et al.

(10) Patent No.: US 9,614,969 B2
(45) Date of Patent: Apr. 4, 2017

(54) IN-CALL TRANSLATION

(71) Applicant: Microsoft Technology Licensing, LLC, Redmond, WA (US)

(72) Inventors: Anthony Aue, Seattle, WA (US); Arul A. Menezes, Sammamish, WA (US); Jonas Nils Lindblom, Solna (SE); Fredrik Furesjö, Solna (SE); Pierre P. N. Greborio, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 65 days.

(21) Appl. No.: 14/622,311

(22) Filed: Feb. 13, 2015

(65) Prior Publication Data
US 2015/0350451 A1  Dec. 3, 2015

Related U.S. Application Data

(60) Provisional application No. 62/003,400, filed on May 27, 2014.

(51) Int. Cl.
*H04M 3/42* (2006.01)
*H04M 1/64* (2006.01)
(Continued)

(52) U.S. Cl.
CPC .......... *H04M 3/568* (2013.01); *G06F 17/289* (2013.01); *H04M 3/42* (2013.01); *H04M 3/567* (2013.01);
(Continued)

(58) Field of Classification Search
CPC ............ G06F 17/289; H04M 2201/50; H04M 2203/2061; H04M 2242/12;
(Continued)

(56) References Cited

U.S. PATENT DOCUMENTS

| | | | | |
|---|---|---|---|---|
| 5,210,789 A | * | 5/1993 | Jeffus ...................... | H04M 3/51 379/122 |
| 8,126,698 B2 | * | 2/2012 | Washizawa ............. | G06F 17/28 704/2 |

(Continued)

FOREIGN PATENT DOCUMENTS

| | | |
|---|---|---|
| EP | 2590393 | 5/2013 |
| WO | WO-9923837 | 5/1999 |
| WO | WO-2010055425 | 5/2010 |

OTHER PUBLICATIONS

"International Search Report and Written Opinion", Application No. PCT/US2015/031456, Aug. 10, 2015, 9 pages.
(Continued)

*Primary Examiner* — Khai N Nguyen

(57) ABSTRACT

The disclosure pertains to a communication system for effecting a voice or video call between at least a source user speaking a source language and a target user speaking a target language. A translation procedure is performed on call audio of the call to generate an audio translation of the source user's speech in the target language for outputting to the target user. A notification is outputted to the target user to notify the target user of a change in the behavior of the translation procedure, the change relating to the generation of the translation.

20 Claims, 13 Drawing Sheets

(51) Int. Cl.
*H04M 3/56* (2006.01)
*G06F 17/28* (2006.01)
*H04N 7/15* (2006.01)

(52) U.S. Cl.
CPC ........ *H04N 7/157* (2013.01); *H04M 2201/50* (2013.01); *H04M 2203/2061* (2013.01); *H04M 2242/12* (2013.01); *H04M 2250/58* (2013.01)

(58) Field of Classification Search
CPC .... H04M 2250/58; H04M 3/42; H04M 3/567; H04M 3/568; H04N 7/157
USPC .................................................. 379/202.01
See application file for complete search history.

(56) References Cited

U.S. PATENT DOCUMENTS

| | | | | |
|---|---|---|---|---|
| 8,711,736 | B2* | 4/2014 | Garcia, Jr. | ............ H04M 3/568 370/260 |
| 2006/0293876 | A1 | 12/2006 | Kamatani | |
| 2008/0077387 | A1 | 3/2008 | Ariu | |
| 2008/0103757 | A1* | 5/2008 | Washizawa | ............. G06F 17/28 704/2 |
| 2008/0151786 | A1* | 6/2008 | Li | ........................ H04L 65/607 370/276 |
| 2009/0006076 | A1 | 1/2009 | Jindal | |
| 2010/0120404 | A1 | 5/2010 | Bernal | |
| 2011/0112837 | A1 | 5/2011 | Kurki-Suonio et al. | |
| 2011/0246172 | A1 | 10/2011 | Liberman et al. | |
| 2012/0038739 | A1* | 2/2012 | Welch | ..................... G06T 15/04 348/14.01 |
| 2012/0069134 | A1* | 3/2012 | Garcia, Jr. | ............ H04M 3/568 348/14.08 |
| 2013/0060570 | A1 | 3/2013 | Williams et al. | |
| 2013/0063550 | A1* | 3/2013 | Ritchey | ................... G03B 37/00 348/36 |
| 2014/0358516 | A1 | 12/2014 | Lin et al. | |
| 2015/0039288 | A1* | 2/2015 | Pedre | .................... G06F 17/289 704/3 |
| 2015/0317975 | A1* | 11/2015 | Ruiz Rodriguez | ... H04M 3/533 704/235 |
| 2015/0347399 | A1 | 12/2015 | Aue et al. | |

OTHER PUBLICATIONS

"International Search Report and Written Opinion", Application No. PCT/US2015/032088, Aug. 31, 2015, 9 pages.

"International Preliminary Report on Patentability", Application No. PCT/US2015/031456, May 18, 2016, 6 pages.

"Non-Final Office Action", U.S. Appl. No. 14/620,142, Nov. 17, 2016, 20 pages.

"Foreign Office Action", CO Application No. NC2016/0005495, Dec. 22, 2016, 3 pages.

* cited by examiner (Avatar waiting)

(Avatar attentive)

(Avatar thinking)

(Avatar talking)

(Avatar confused)

IN-CALL TRANSLATION

RELATED APPLICATIONS

This application claims priority to U.S. Provisional Application No. 62/003,400, filed May 27, 2014, entitled "IN-CALL TRANSLATION", the entire disclosure of which is hereby incorporated by reference herein in its entirety.

BACKGROUND

Communication systems allow users to communicate with each other over a communication network e.g. by conducting a call over the network. The network may be, for example, the Internet or public switched telephone network (PSTN). During a call, audio and/or video signals can be transmitted between nodes of the network, thereby allowing users to transmit and receive audio data (such as speech) and/or video data (such as webcam video) to each other in a communication session over the communication network.

Such communication systems include Voice or Video over Internet protocol (VoIP) systems. To use a VoIP system, a user installs and executes client software on a user device. The client software sets up VoIP connections as well as providing other functions such as registration and user authentication. In addition to voice communication, the client may also set up connections for communication modes, for instance to provide instant messaging ("IM"), SMS messaging, file transfer and voicemail services to users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect, there is disclosed a computer-implemented method performed in a communication system. The communication system is for effecting a voice or video call between at least a source user speaking a source language and a target user speaking a target language. Call audio of the call is received, the call audio comprising speech of the source user in the source language. A translation procedure is performed on the call audio to generate an audio translation of the source user's speech in the target language for outputting to the target user. A change in the behaviour of the translation procedure is signalled, the change relating to the generation of the translation, thereby causing a notification to be outputted to the target user to notify the target user of the change.

According to a second aspect, there is disclosed a computer system for use in a communication system. The communication system is for effecting a voice or video call between at least a source user speaking a source language and a target user speaking a target language. The computer system comprises one or more audio output components available to the target user, a translation output component, and a notification output component. The translation output component is configured to output an audio translation of the source user's speech in the target language to the target user via the audio output components. The translation is generated by performing an automatic translation procedure on call audio of the call which comprises speech of the source user in the source language. The notification output component is configured to output a notification to the target user to notify the target user of a change in the behaviour of the translation procedure, the change relating to the generation of the translation.

According to a third aspect, there is disclosed a computer program product comprising computer code stored on a computer readable storage medium configured, when executed, to implement any of the methods or systems disclosed herein.

BRIEF DESCRIPTION OF FIGURES

For a better understanding of the subject matter and to show how the same may be carried into effect, reference will now be made by way of example only to the following drawings in which.

DETAILED DESCRIPTION

Embodiments will now be described by way of example only.

Figure 1:
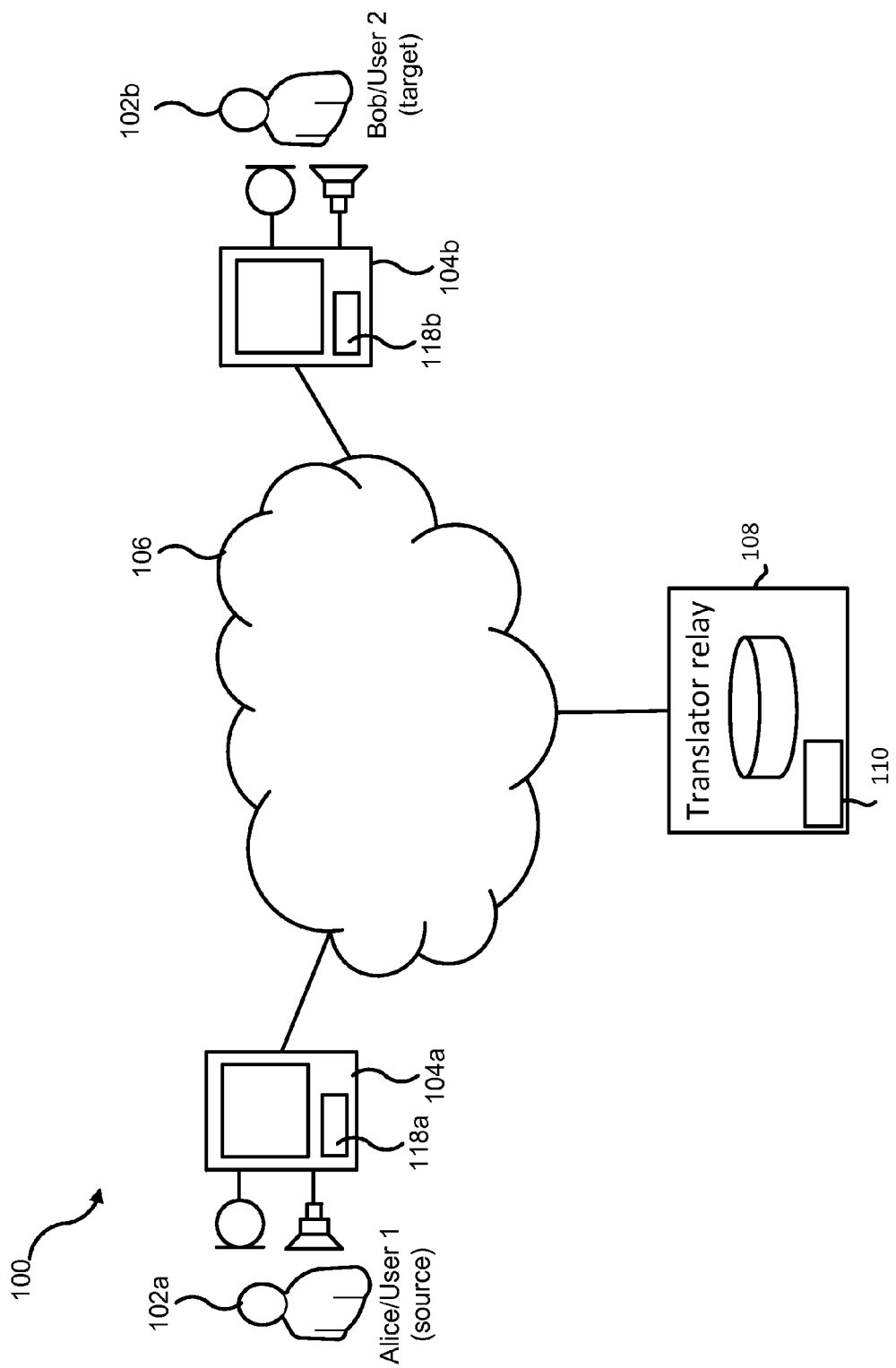
FIG. 1 is a schematic illustration of a communication system.

Reference is first made to FIG. 1, which illustrates a communication system 100 which is a packet-based communication system in this embodiment but which may not be packet-based in other embodiments. A first user 102a of the communication system (User A or "Alice") operates a user device 104a, which is shown connected to a communications network 106. The first user (Alice) is also referred to below as a "source user" for reasons that will become apparent. The communications network 106 may for example be the Internet. The user device 104a is arranged to receive information from and output information to the user 102a of the device.

The user device 104a is running a communication client 118a, provided by a software provider associated with the communication system 100. The communication client 108a is a software program executed on a local processor in the user device 104a which allows the user device 104a to establish communication events—such as audio calls, audio-and-video calls (equivalently referred to as video calls), instant messaging communication sessions, etc.—over the network 106.

FIG. 1 also shows a second user 102b (User B or "Bob") who has a user device 104b which executes a client 118b in order to communicate over the network 106 in the same way that the user device 104a executes the client 118a to communicate over the network 106. Therefore users A and B (102a and 102b) can communicate with each other over the communications network 106. The second user (Bob) is also referred to below as a "target user" for reasons that will again become apparent.

There may be more users connected to the communications network 106, but for clarity only the two users 102*a* and 102*b* are shown connected to the network 106 in FIG. 1.

Note that in alternative embodiments, the user devices 104*a* and/or 104*b* can connect to the communication network 106 via additional intermediate networks not shown in FIG. 1. For example, if one of the user devices is a particular type of mobile device, then it may connect to the communication network 106 via a cellular mobile network (not shown in FIG. 1), for example a GSM or UMTS network.

Communication events between Alice and Bob can be established using the clients 118*a*, 118*b* in various ways. For instance, a call can be established by one of Alice and Bob instigating a call invitation to the other (either directly or indirectly by way of an intermediary network entity such as a server or controller) which the other accepts, and can be terminated by one of Alice and Bob electing to end the call at their client. Alternatively, as explained in more detail below, a call can be established by requesting that another entity in the system 100 establish a call with Alice and Bob as participants, the call being a multiparty (specifically 3-way) call between Alice, Bob and that entity in that event.

Each communication client instance 118*a*, 118*b* has a log in/authentication facility which associates the user devices 104*a*, 104*b* with their respective users 102*a*, 102*b* e.g. by the user entering a username (or other suitable user identifier conveying an identity of that user within the system 100) and password at the client and which is verified against user account data stored at a server (or similar) of the communication system 100 as part of an authentication procedure. Users are thus uniquely identified by associated user identifiers (e.g. usernames) within the communication system 100, with each user name being mapped to respective client instance(s) to which data (e.g. call audio/video) for that identified user can be transmitted.

Users can have communication client instances running on other devices associated with the same log in/registration details. In the case where the same user, having a particular username, can be simultaneously logged in to multiple instances of the same client application on different devices, a server (or similar) is arranged to map the username (user ID) to all of those multiple instances but also to map a separate sub-identifier (sub-ID) to each particular individual instance. Thus the communication system is capable of distinguishing between the different instances whilst still maintaining a consistent identity for the user within the communication system.

User 102*a* (Alice) is logged-in (authenticated) at client 118*a* of device 104*a* as "User 1". User 102*b* (Bob) is logged-in (authenticated) at client 118*b* of device 104*b* as "User 2".

Figure 2:
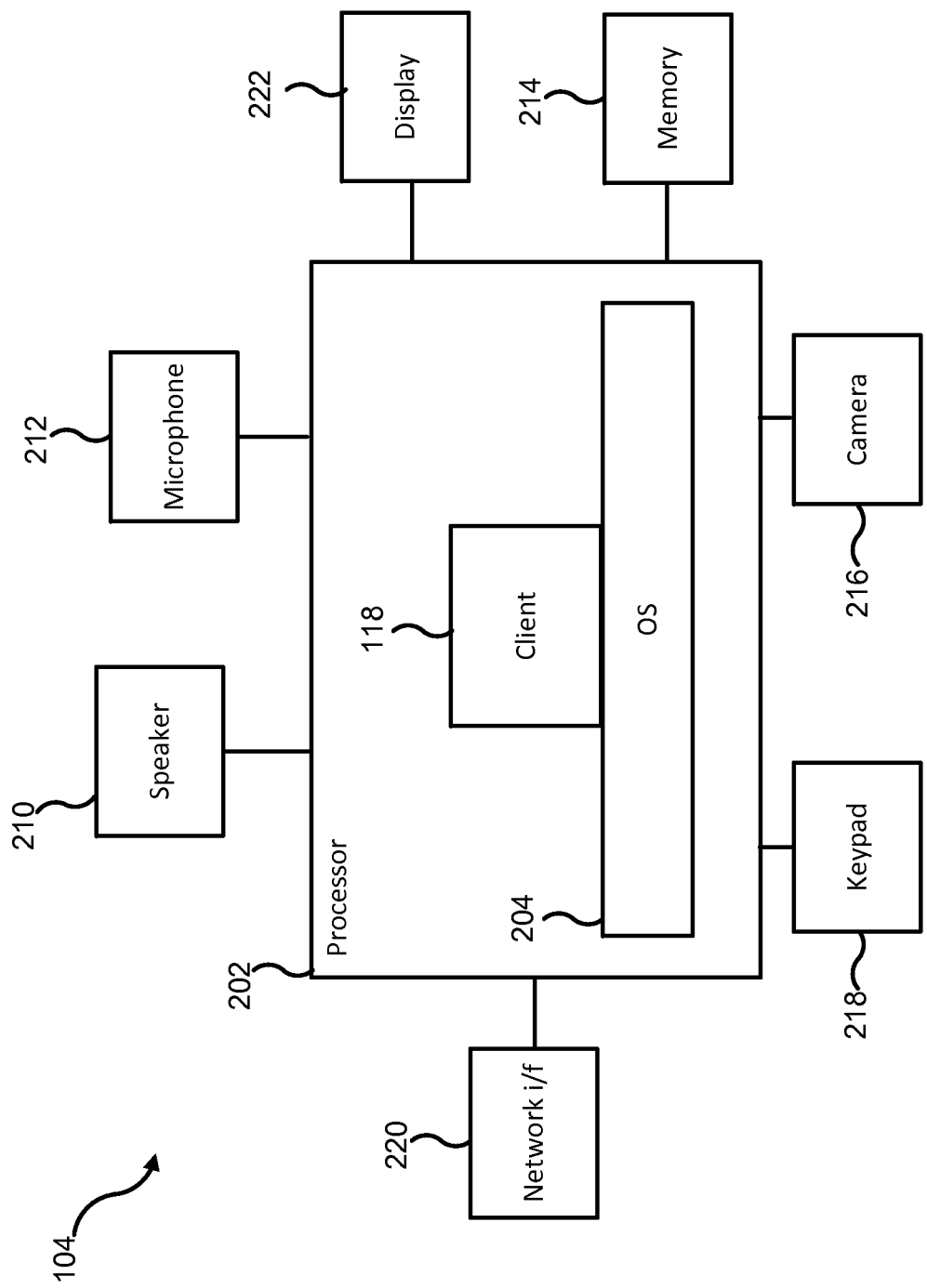
FIG. 2 is a schematic block-diagram of a user device.

FIG. 2 illustrates a detailed view of a user device 104 (e.g. 104*a*, 104*b*) on which is executed a communication client instance 118 (e.g. 118*a*, 118*b*). The user device 104 comprises at least one processor 202 in the form of one or more central processing units ("CPUs"), to which is connected a memory (computer storage) 214 for storing data, an output device in the form of a display 222 (e.g. 222*a*, 222*b*), having an available display area, such as a display screen, a keypad (or a keyboard) 218 and a camera 216 for capturing video data (which are examples of input devices). The display 222 may comprise a touchscreen for inputting data to the processor 202 and thus also constitute an input device of the user device 104. An output audio device 210 (e.g. one or more loudspeakers) and an input audio device 212 (e.g. one or more microphones) are connected to the CPU 202. The display 222, keypad 218, camera 216, output audio device 210 and input audio device 212 may be integrated into the user device 104, or one or more of the display 222, the keypad 218, the camera 216, the output audio device 210 and the input audio device 212 may not be integrated into the user device 104 and may be connected to the CPU 202 via respective interfaces. One example of such an interface is a USB interface. For example an audio headset (that is, a single device that contains both an output audio component and an input audio component) or headphones//ear buds (or similar) may be connected to a user device via a suitable interface such as USB or audio jack-based interface.

The CPU 202 is connected to a network interface 220 such as a modem for communication with the communications network 106 for communicating over the communication system 100. The network interface 220 may or may not be integrated into the user device 104.

The user device 104 may be, for example, a mobile phone (e.g. smartphone), a personal computer ("PC") (including, for example, Windows™, Mac OS™ and Linux™ PCs), a gaming device, television (TV) device (e.g. smartTV) tablet computing device or other embedded device able to connect to the network 106.

Some of the components mentioned above may not be present in some user devices e.g. a user device may take the form of a telephone handset (VoIP or otherwise) or telephone conferencing device (VoIP or otherwise).

FIG. 2 also illustrates an operating system ("OS") 204 executed on the CPU 202. The operating system 204 manages hardware resources of the computer and handles data being transmitted to and from the network via the network interface 220. The client 118 is shown running on top of the OS 204. The client and the OS can be stored in memory 214 for execution on the processor 202.

The client 118 has a user interface (UI) for presenting information to and receiving information from a user of the user device 104. The user interface comprises a graphical user interface (GUI) for displaying information in the available area of the display 222.

Returning to FIG. 1, Alice 102, the source user, speaks a source language; Bob, the target user, speaks a target language other than the source language (i.e. different from the source language) and does not understand the source language (or has only limited understanding thereof). It is thus likely that Bob will be unable to understand, or at least have difficulty in understanding what Alice says in a call between the two users. In the examples below, Bob is presented a Chinese speaker and Alice an English speaker—as will be appreciated this is just one example and the user can speak any two languages of any country or region. Further, "different languages" as used herein is also used to mean different dialects of the same language.

To this end, a language translation relay system (translator relay system) 108 is provided in the communication system 100. The purpose of the translator relay is translating audio in a voice or video call between Alice and Bob. That is, the translator relay is for translating call audio of a voice or video call between Alice and Bob from the source language to the target language to facilitate in-call communication between Alice and Bob (that is, to aid Bob in comprehending Alice during the call and vice versa). The translator relay generates a translation of call audio received from Alice in the source language, the translation being in the target language. The translation may comprise an audible translation encoded as an audio signal for outputting to Bob via the loudspeaker(s) of his device and/or a text-based translation for displaying to Bob via his display.

As explained in more detail below, the translator relay system 108 acts as both a translator and a relay in the sense that it receives untranslated call audio From Alice via the network 106, translates it, and relays the translated version of Alice's call audio to Bob (that is, transmits the translation directly to Bob via the network 106 for outputting during the call e.g. in contrast to, say, Alice or Bob's user device acting as a requestor by requesting a translation from a translator service, which is returned to the requestor to be passed on to the other device by the requestor itself). This represents a quick and efficient path through the network, which minimizes the burden placed on the clients in terms of network resources and increased the overall speed at which the translation reaches Bob.

The translator performs a "live" automatic translation procedure on a voice or video call between Alice and Bob in the sense that the translation is to some extent synchronous with Alice and Bob's natural speech. For instance, typically natural speech during conversation will involve intervals of speech Activity by Alice (that is, intervals in which Alice is speaking interspersed with intervals of speech inactivity by Alice e.g. when Alice pauses for thought or is listening to Bob. An interval of speech activity may e.g. correspond to a sentence or small number of sentences preceded and followed by a pause in Alice's speech. The live translation may be performed per-such interval of speech activity so a translation of Alice's immediately preceding interval of speech activity is triggered by a sufficient (e.g. predetermined) interval of speech inactivity ("immediately preceding" referring to the most recent interval of speech activity that has not already been translated). In this case, as soon as that translation is complete, it may be transmitted to Bob for outputting so that Bob hears it as soon as possible after hearing Alice's most recent period of natural speech activity i.e. so that a period of speech Activity by Alice is heard by Bob, followed by a short pause (while the translation and transmission thereof are performed), followed by Bob hearing and/or seeing the translation of Alice's speech in that interval. Performing translation on a per-such interval basis may result in a higher quality of translation as the translation procedure can make use of the context in which words appear in a sentence to effect a more accurate translation. Because the translator service is acting as a relay, the length of this short pause is minimized resulting in a more natural user experience for Bob.

Alternatively, the automatic translation may be performed on a per-word or per several word basis and e.g. outputted whilst Alice's speech is still ongoing and being heard by Bob e.g. as subtitles displayed on Bob's device and/or as audio played out over the top of Alice's natural speech (e.g. with the volume of Alice's speech reduced relative to the audible translation). This may result in a more responsive user experience for Bob as the translation is generated in near-real-time (e.g. with a less than approx. 2 second response time). The two can also be combined; for instance the intermediate results of the (translated) speech recognition system may be displayed on screen, enabling them to be edited as the best hypothesis changes as the sentence goes on, and the translation of the best hypothesis then translated into audio (see below).

Figure 3:
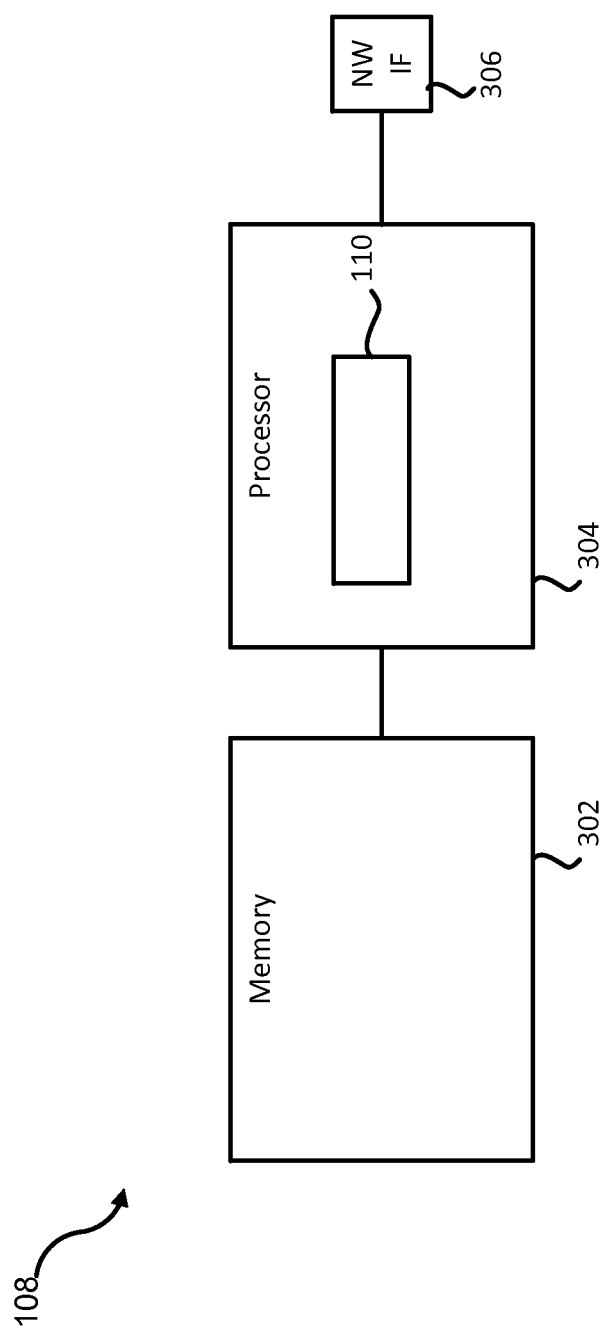
FIG. 3 is a schematic block-diagram of a server.

FIG. 3 is a detailed view of the translator relay system 108. The translator relay system 110 comprises at least one processor 304, which executes code 110. Connected to the processor 304 are computer storage (memory) 302 for storing the code 110 for said execution and data, and a network interface 306 for connecting to the network 106.

Although shown as a single computer device, the functionality of the relay system 108 may alternatively be distributed across multiple computer devices, e.g. multiple servers for instance located in the same datacentre. That is, the functionality of the relay system may be implemented by any computer system comprising one or more computer devices and one or more processors (e.g. one more processor cores). The computer system may be "localized" in the sense that all of the processing and memory functionality is located at substantially the same geographic location (e.g. in the same datacentre comprising one or more locally networked servers, running on the same or different server devices of that datacentre). As will be apparent, this can help to further increase the speed at which the translation is relayed to Bob (which in the example above reduces the length of the short pause between Alice finishing an interval of speech and the commencement of the translation output even further, resulting in an even better user experience for Bob).

As part of the code 110, the memory 302 holds computed code configured to implement a translator agent. As explained in more detail below, the translator agent is also associated with its own user identifier (user name) within the communication system 100 in the same way that users are associated with corresponding usernames. Thus, the translator agent is also uniquely identified by an associated user identifier and thereby appears, in some embodiments, as another user of the communication system 100, for instance appearing to be constantly an online user which 'real' users 104a, 104b can add as a contact and transmit data to/receive data from using their respective clients 118a, 118b; in other embodiments, the fact that a bot having a user identifier may be hidden (or at least disguised so as to be substantially hidden) to the users e.g. with the client UIs configured such that the users would be unaware of bot identities (discussed below).

As will be appreciated, multiple bots can share the same identity (that is, be associated with the same username) and those bots can be distinguished using different identifiers which may be invisible to end-users.

The translator relay system 108 may also perform other functions which are not necessarily directly related to translation such as mixing of call audio streams as in example embodiments described below.

Figure 4A:
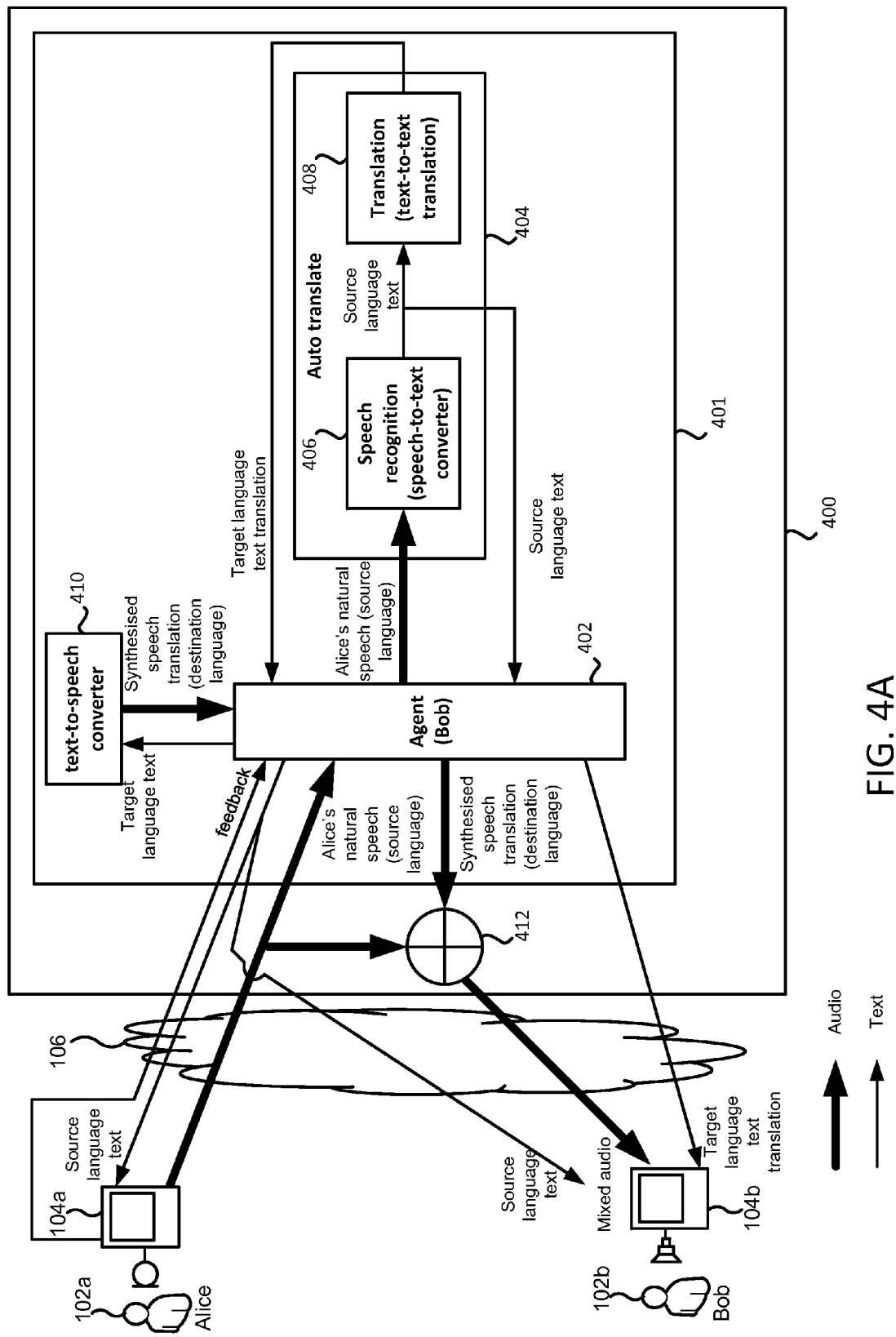
FIG. 4A is a function block diagram showing communication system functionality.
Figure 4B:
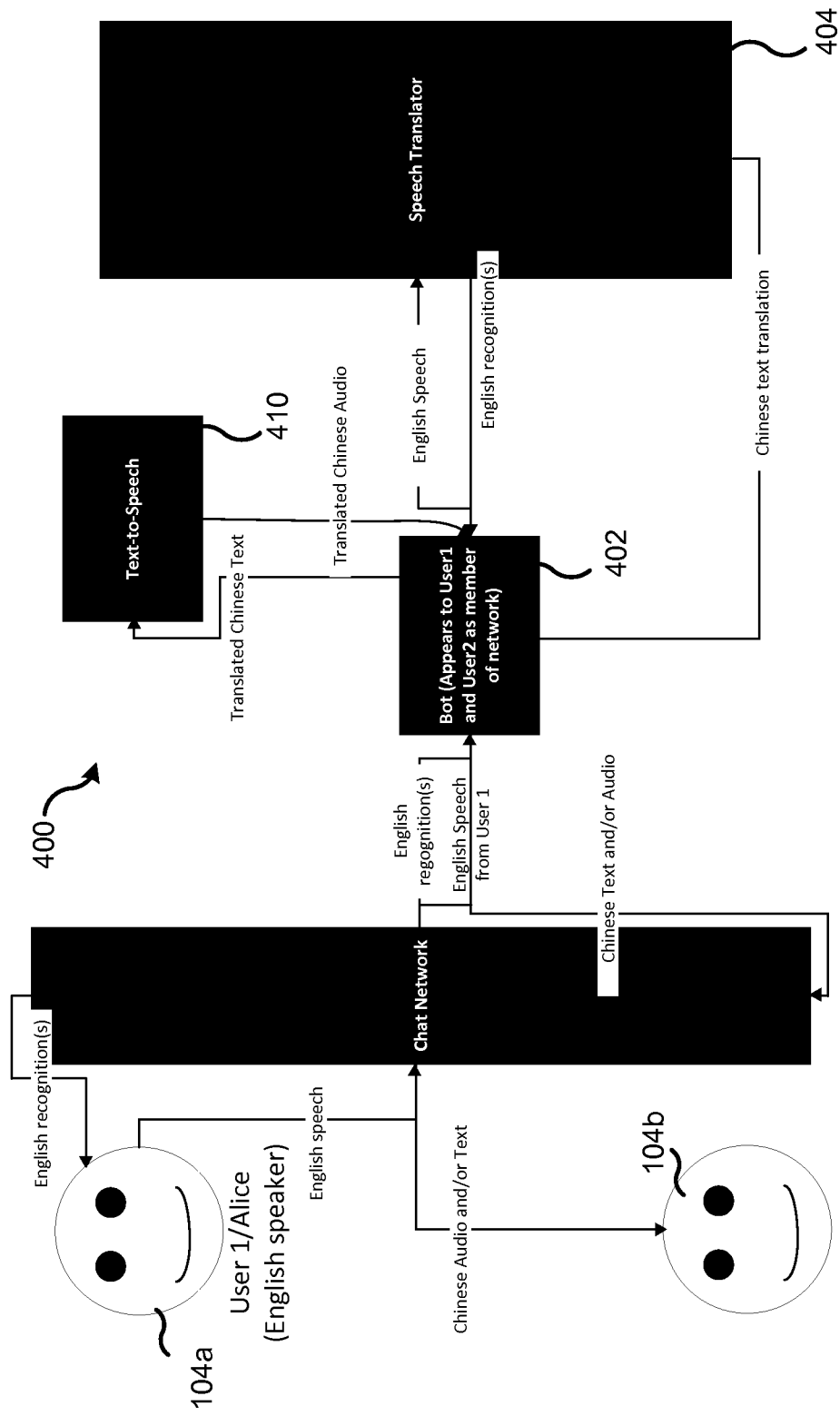
FIG. 4B is a function block diagram showing some of the components of FIG. 4A.

FIG. 4A is a function block diagram illustrating interactions and signalling between the user devices 104a, 104b and a call management component 400. In accordance with the various methods described below, the call management system 400 facilitates interpersonal communication between people who do not share a common language (e.g. Alice and Bob). FIG. 4B is another illustration of some of the components shown in FIG. 4A.

The call management component 400 represents functionality implemented by executing the code 110 on the translator relay system 108. The call management component is shown comprising functional blocks (components) 402-412 which represent different functions performed by said code 110 when executed. Specifically, the call managements component 400 comprises the following components: an instance 402 of the aforementioned translator agent whose functionality is described in more detail below, an audio translator 404 configured to translate audio speech in the source language into text in the target language, a text-to-speech converter 410 configured to convert text in the destination language to synthesised speech in the destination language, and an audio mixer 412 configured to mix multiple input audio signals to generate a single mixed audio stream comprising audio from each of those signals. The audio translator comprises an automatic speech recognition component 406 configured for the source language. That is, configured for recognizing the source language in received audio i.e. for identifying that particular portions of sound correspond to words in the source language (specifically to convert the audio speech in the source language into text in the source language in this embodiment; in other embodiments, It need not be text—for instance, the translator may translate a full set of hypotheses provided by the speech engine, represented as a lattice, which could be encoded in various ways). The speech recognition may also be configured to identify which language the source user is speaking on-the-fly (and configured for the source language in response e.g. configured to a 'French-to- . . . ' mode in response to detecting French), or it may be preconfigured for the source language (e.g. via a UI or profile setting, or by instant messaging-based signalling etc. which preconfigures the bot to, say, a 'French-to- . . . ' mode) The component 400 also comprises a text translator 408 configured to translate text in the source language into text in the target language. Collectively components 404, 408 implement the translation functionality of the audio translator 404. The components 402, 404 and 410 constitute a back-end translation subsystem (translation service) 401 with the components 404 and 410 constituting a speech-to-speech translation (S2ST) subsystem thereof and the agent operating as an intermediary between the clients 118a/118b and that subsystem.

As indicated, the components of FIG. 4A/4B may represent processes running on the same machine or distinct processes running on different machines (e.g. the speech recognition and text translation may be implemented as two distinct processes running on different machines).

The translator agent has a first input connected to receive call audio from Alice's user device 104a via the network 106, a first output connected to an input of the audio translator 404 (specifically, of the speech recognition component 406), a second input connected to an output of the speech recognition component 406 (which is a first output of the audio translator 404), a third input connected to an output of the text translator 408 (which is a second output of the audio translator 404), a second output connected to a first input of the mixer 412, a third output connected to transmit translated text in the target language to Bob's user device 104b, and a fourth output configured to transmit recognized text in the source language to both Alice's user device 104a and also to Bob's user device 104b. The agent 402 also has a fourth input connected to an output of the text-to-speech converter 410 and a fifth output connected to an input of the text-to-speech converter. The mixer 412 has a second input connected to receive the call audio from Alice's device 104a and an output connected to transmit the mixed audio stream to Bob via the network 106. The output of the speech recognition component 406 is also connected to an input of the text translator 408. The agent 402 has a fifth input connected to receive feedback data from Alice's user device 104a via the network 106 conveying source user feedback on the results of the source recognition procedure (e.g. indicating the accuracy thereof), the feedback information having been selected at Alice via her client user interface and conveying information pertaining to the recognized text for use in configuring the speech recognizer 406 to improve its results. Alice is in a potion to provide this information as she receives information pertaining to the results of the speech recognition which can be output via her client user interface.

Inputs/outputs representing audio signals are shown as thick solid arrows in FIG. 4A; inputs/outputs representing text-based signals are shown as thin arrows.

The translator agent instance 402 functions as an interface between Alice and Bob's clients 118 and the translation subsystem 401 and operates as an independent "software agent". Agent-based computing is known in the art. A software agent is an autonomous computer program that carries out tasks on behalf of users in a relationship of agency. In acting as a software agent, the translator agent 402 functions as an autonomous software entity which, once initiated (e.g. responsive to an initiation of a call or related session) runs substantially continuously over the duration of that specific call or session (as opposed to being executed on demand; that is as opposed to being executed only when required to perform some specific task), awaiting inputs which, when detected, trigger automated tasks to be performed on those inputs by the translator agent 402.

In particular embodiments, the translator agent instance 402 has an identity within the communication system 100 just as users of the system 100 have identities within the system. In this sense, the translator agent can be considered a "bot"; that is an artificial intelligence (AI) software entity that appears as a regular user (member) of the communication system 100 by virtue of its associated username and behaviour (see above). In some implementations, a different respective instance of a bot may be assigned to each call (i.e. on an instance-per-call basis), e.g. EnglishSpanishTranslator1, EnglishSpanishTranslator2. That is, in some implementations the bot is associated to a single session (e.g. call between two or more users). On the other hand, the translation service to which the bot provides an interface may be shared among multiple bots (and also other clients).

In other implementations, a Bot instance that is able to carry on multiple conversations at the same time could be configured in a straightforward manner.

In particular, human users 104a, 104b of the communication system 100 can include the bot as a participant in voice or video calls between two or more human users e.g. by inviting the bot to join an established call as a participant, or by requesting that the bot initiate a multiparty call between the desired two or more human participants and the bot itself. The request is instigated by the client user interface of one of the client 118a, 118b, which provides options for selecting the bot and any desired human users as call participants e.g. by listing the humans and the bots as contacts in a contact list displayed via the client user interface.

Bot-based embodiments do not require specialized hardware devices or specialized software to be installed on users' machines and/or require the speakers (that is, participants) to be physically close to each other as the bot can be seamlessly integrated into existing communication system architecture without the need to e.g. redistributed updated software clients.

The agent 402 (bot) appears on the communication system 100 (alternatively referred to as chat network) as a regular member of the network. Conversation participants can get their interlocutors' speech translated into their language by inviting the appropriate bot into a voice or video call (also referred to as chat session or conversation) e.g. a Chinese speaker speaking with an English speaker could invite an agent named (i.e. having a username) "English-Chinese-Translator" into the conversation. The bot then takes the role of translator or interpreter throughout the rest of the conversation, translating any speech in its source language to its target language. This can be presented as text (for displaying at the target device e.g. via subtitles or in a chat window of the target client user interface) and/or as target language speech (for playing out via loudspeaker(s) at the target device, generated using the text-to-speech component 410).

Embodiments thus provide:

Seamless integration into multimedia call/chat services (no separate installation required)

Remote communication (participants don't have to be physically close)

Device-agnostic server-based implementations (such that service clients e.g. 104a, 104b for new platforms don't require any separate software), which enables a more seamless deployment of upgrades and new features.

In some embodiments, the bot has access to separate audio streams per speaker, allowing higher quality speech recognition.

In such embodiments, at the top level is the "bot," which appears to users of the chat system just as a regular human network member would. The bot intercepts audio stream(s) from all the users who speak its source language (e.g. 104a), and passes them on to a speech-to-text translation system (audio translator 404). The output of the speech-to-text translation system is target language text. The bot then communicates the target language information to the target language user(s) 104b. The bot may also communicate the speech recognition results of the source audio signal to the source speaker 104a and/or the target listener 104b. The source speaker can then correct the recognition results by feeding back correction information to the bot via the network 106 in order to get a better translation, or try repeating or restating their utterance (or portions thereof) in order to achieve better recognition and translation. Alternatively the speaker could be presented with an n-best list or representation of the speech lattice (that is, a a graph visually repressing different possible hypotheses for the recognized source speech), allowing them to clarify or correct imperfect 1-best recognitions by feeding back selection information identifying the best hypothesis. Recognition information (e.g. the source language text itself) could also be transmitted to the target user—this may be useful to listeners who have a small degree of proficiency in the source language or whose reading comprehension in that language is better than their listening comprehension. Having access to the source text might also allow the target user to make more sense of ambiguous or incorrect translation; named entities such as names of people or places, for instance, might be recognized correctly by the speech recognition system but incorrectly translated.

The implementation details of the bot depend on the architecture of and level of access to the chat network.

Implementations for systems providing SDK's ("Software Developer Kits") will depend on the features provided by the SDK. Typically these will provide read access to separate video and audio streams for each conversation participant, and write access to the video and audio streams for the bot itself.

Some systems provide server-side Bot SDK's, which allow full access to all streams and enable scenarios such as imposing video subtitles over the source speaker's video signal and/or replacing or mixing the source speaker's audio output signal. Finally, where complete control over the system is available, translation can be integrated in any manner, including changes to client UI in order to make the inter-lingual conversation experience easier for the users.

At the weakest level, "closed" networks without publicly defined protocols and/or SDK's could be served by bots that intercept and modify the signals to and from the microphone, camera and speaker devices on a client computer (e.g. 104a, 104b—rather than at a separate relay). In this case, the bot may perform language detection in order to figure out which portions of the signal are in its source language (e.g. to distinguish from speech in other languages in a mixed audio stream).

The communication of the target language text can happen in various ways; the text can be communicated in a public (universally visible/audible to all call participants e.g. Alice as well as Bob) or private (solely between the bot and the target user) chat channel and/or as video subtitles superimposed either on the bot's or the source language speaker's video stream. The text can also be passed to a text-to-speech component (text-to-speech converter 410), which renders the target language text as an audio signal which can either replace the speaker's original audio signal or else be mixed with it. In an alternative embodiment, only the translated text is sent over the network and the text-to-speech synthesis is performed on the client side (saving network resources).

Translation can either be turn-based (the Bot waits until the user pauses or indicates in some other way that their utterance is complete, like, say, clicking button, then communicates the target language information) or simultaneous—that is, substantially contemporaneous with the source speech (the Bot begins to communicate the target language information the moment it has enough text to produce semantically and syntactically coherent output). The former uses Voice Activation Detection to determine when to commence translating a preceding portion of speech (translation being per interval of detected speech activity); the latter uses voice activation detection and an automatic segmentation component (being performed, for each interval of detected speech activity, on a per segment of that interval, which may have one or more segments). As will be appreciated, components for performing such functions are readily available. In the turn-based scenario the use of a bot acting as a third party virtual translator in the call would aid the users by framing them in a common real world scenario with a translator (such as one might have in a courtroom); simultaneous translation is analogous to a human simultaneous interpreter (e.g. such as one encounters in the European Parliament or the UN). Thus, both provide an intuitive translation experience for the target user(s).

It should be noted that references to "automated translation" (or similar) as used herein cover both turn-based and simultaneous translation (among others). That is, "automated translation" (or similar) covers both the automated emulation of human translators and human interpreters.

As will be appreciated, the subject matter is not restricted to any particular speech recognition or translation components—for all intents and purposes, these can be treated as a black box. Techniques for rendering a translation from a speech signal are known in the art, and there are numerous components available to perform such functions.

Although FIGS. 4A/4B show only a one-way translation for the sake of simplicity, it will be readily appreciated that the bot 402 can perform equivalent translation functions on Bob's call audio for the benefit of Alice. Similarly, whilst methods below are described in relation to one-way translation for simplicity, it will be appreciated that such methods can be applied to two-way (or multi-way) translation.

Figure 5:
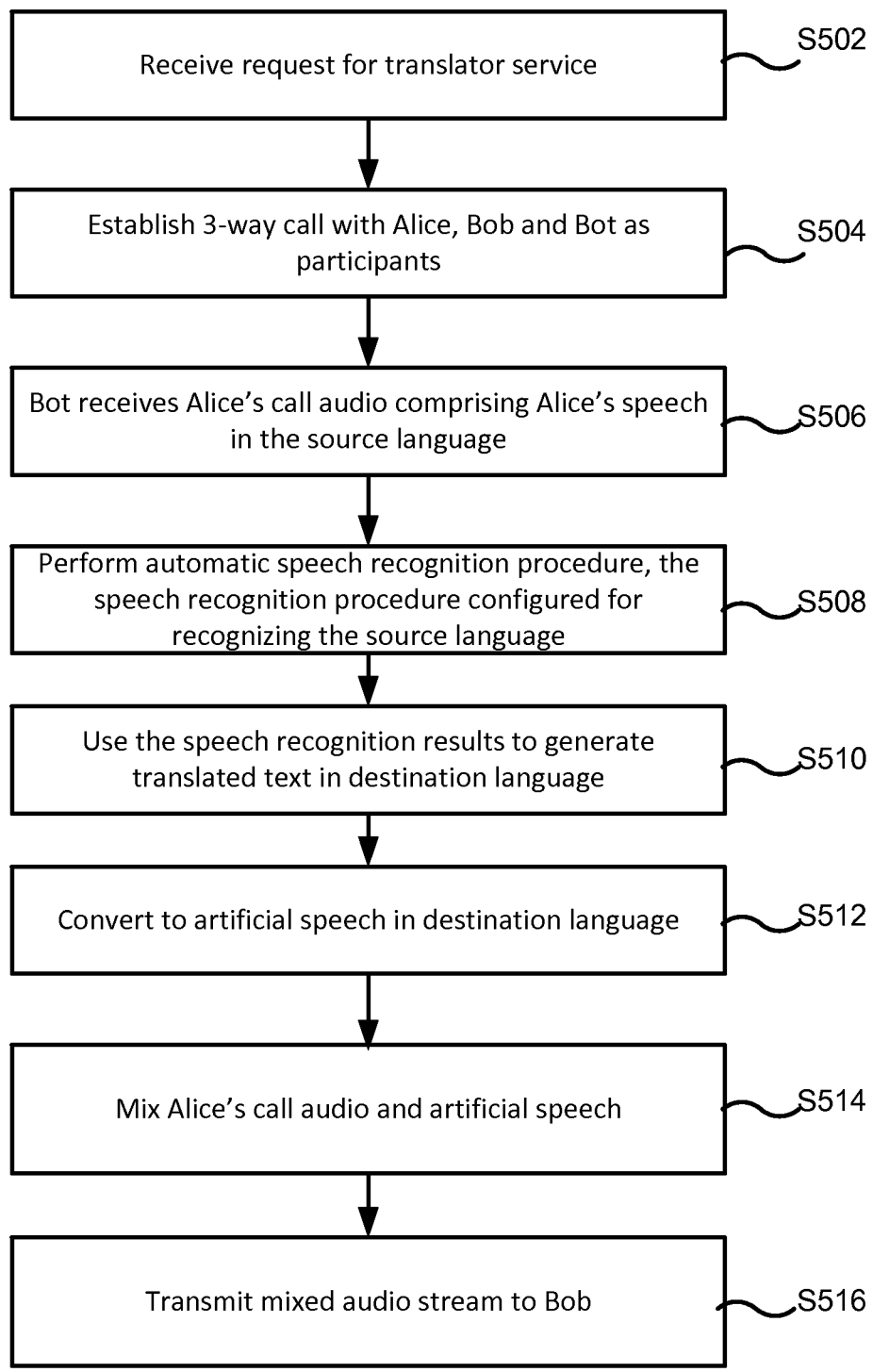
FIG. 5 is a flowchart for a method of facilitating communication between users as part of a call.

A method of facilitating communication between users during a voice or video call between those users will now be described with reference to FIG. 5, which is a flow chart for the method. FIG. 5 describes an in-call translation procedure from Alice's language to Bob's language only for simplicity; it will be appreciated that a separate and equivalent process can be performed to translate from Bob's language to Alice's language simultaneously in the same call (from which perspective, Alice could be viewed as the target and Bob as the source).

At step S502, a request for a translator service is received by the translator relay system 108, requesting that the bot perform a translation service during a voice or video call in which Alice, Bob and the bot will be participants. The call thus constitutes a multiparty (group)—specifically three-way—call. At step S504, the call is established. The request may be a request for the agent 402 to establish a multiparty call between the bot 402 and at least Alice and Bob in which case the bot establishes the call (with S502 thus being before S504) by instigating call invitations to Alice and Bob, or the request may be an invitation for the bot 402 to join an already-established call between at least Alice and Bob (with S504 thus being after S502) in which case Alice (or Bob) establishes the call by instigating call invitations to Bob (or Alice) and the bot). It may be instigated via the client UI or automatically either by the client or some other entity (e.g. a calendar service configured to automatically instigate a call at a pre-specified time).

At step S506, the bot 402 receives Alice's call audio as an audio stream via network 106 from Alice's client 118a. The call audio is audio captured by Alice's microphone, and comprises Alice's speech which is in the source language. The bot 402 supplies the call audio to the speech recognition component 406.

At step S508, the speech recognition component 406 performs a speech recognition procedure on the call audio. The speech recognition procedure is configured for recognizing the source language. Specifically, the speech recognition procedure detects particular patterns in the call audio which it matches to known speech patterns of the source language in order to generate an alternative representation of that speech. This may for instance be a textual representation of that speech as a string of characters in the source language, with the procedure constituting a source-speech-to-source text recognition procedure, or some other representation such as a feature vector representation. The results of the speech recognition procedure (e.g. string/feature vectors) are input to the text translator 408, and are also supplied back to the bot 402.

At step S510, the speech translator 408 performs a translation procedure on the input results into text in the target language (or some other similar representation). The translation is performed 'substantially-live e.g. on a per-sentence (or few sentences), per detected segment, or per-word (or few words) basis as mentioned above. Thus, translated text is outputted semi-continuously as call audio is still being received from Alice. The target language text is supplied back to the bot 402.

At step S512, the target language text is supplied by the bot to the text-to-speech converter, which converts the target language text into artificial speech spoken in the target language. The synthetic speech is supplied back to the bot 402.

Because both the text output from the audio translator 404 and the synthetic speech are in the target language, they are comprehensible to Bob who speaks the target language.

At step S514, the synthetic audio is supplied to the mixer 412 where it is mixed with Alice's original audio (comprising her original, natural speech) to generate a mixed audio stream comprising both the synthetic translated speech in the target language and the original natural speech in the source language, which is transmitted to Bob via the network 106 (S516) for outputting via the audio output device(s) of his user device as part of the call. Bob can thus gauge Alice's tone etc. from the natural speech (even if he doesn't understand it), whilst grasping the meaning from the synthetic speech resulting in a more natural communication. That is, the system can also transmit Alice's untranslated audio as well as the translated audio. Further, even when the target user does not understand the source language, there is still information to be gleaned there from e.g. intonation (they may be able to tell whether the source speaker is asking a question, for instance).

Alternatively, Alice's speech original signal may not be transmitted to Bob such that only the synthetic, translated speech may is transmitted to Bob.

As mentioned, the target language text may also be transmitted to Bob by the bot (and displayed via his client user interface e.g. in a chat interface or as subtitles). As also mentioned, the source language text obtained by the speech recognition procedure on which the translation is based—and/or other recognition information pertaining to the speech recognition process performed on her speech, such as alternative possible recognitions (e.g. where there is ambiguity recognized in performing the recognition procedure)—from the recognition procedure may also be transmitted to Alice and displayed via her user interface so that she can gauge the accuracy of said recognition procedure. The client user interface may present various feedback options by which Alice can feed information back to the bot via the network in order to improve and refine the speech recognition procedure as performed on her speech. The source language text may also be transmitted to Bob (e.g. if Bob selects an option to receive this via his client user interface), e.g. if Bob is more proficient at reading the source language spoken by Alice than he is interpreting it aurally.

In embodiments, the speech-to-text component 406 may output a text version of each word as that word is recognised (e.g. on a per word basis) or some other partial, intermediate speech recognition results, which can be displayed at Alice's user device as she is speaking. That is, the speech recognition procedure may be configured, for at least one interval of speech activity by the source user, to generate partial 'provisional' speech recognition results whilst that speech activity is ongoing before generating final speech recognition results when that speech activity is completed (i.e. when Alice stops speaking at least temporarily). The translation is ultimately generated using the final results (not the partial results, which may be subject to change before the translation is performed—see below) but information pertaining to the partial results in nonetheless transmitted and outputted to Alice before the translation is generated. This invites the source user (Alice) to influence the subsequent translation e.g. by modifying their speech activity (e.g. by repeating some portion they can see to have been wrongly interpreted) according whenever they observe that inaccuracies are present in the partial results.

As Alice continues to speak, the recognition procedure is then refined so that the component 406 can effectively 'change its mind' about word(s) it has previously recognised if appropriate in view of the context provided by subsequent words. In general, the component 406 may generate initial (and effectively provisional) speech recognition results in substantially real-time (e.g. with the results being updated on a time scale of order 2 seconds), which can be displayed to Alice in substantially real-time so that she can get a sense of how accurately her speech is being recognized—even if the provisional results are subject to change before producing final results from which the audio is actually generated, they may still give enough of an idea to be useful to Alice.

For instance, if Alice can see that the recognition procedure has interpreted her speech in a highly inaccurate manner (and therefore knows that, were she simply to continue speaking, the resulting translation subsequently output to Bob would be garbled or nonsensical), she can cut short her current flow of speech and repeat what she has just said rather than having to finish an entire portion of speech before the error becomes apparent (e.g. which might otherwise only be the case after Bob has heard and failed to understand the garbled or nonsensical translation). As will be appreciated, this will help to facilitate a natural flow of conversation between Alice and Bob. Another possibility is to have a button or other UI mechanism which Alice can use to stop the current recognition and start over.

In this embodiment, the mixer 412 of FIG. 4A is also implemented by the relay system 108 itself. That is, as well as implementing translator functions, the relay system 108 also implements call audio mixing functions. Implementing mixing functionality (whereby, for each human participant, multiple individual audio streams are mixed into a single respective audio stream to be transmitted to that user) at the relay system 108 itself rather than elsewhere in the system (e.g. at one of the user devices 104*a*, 104) provides convenient access to the individual audio streams to the Bot—as mentioned above, having access to the individual call audio streams can result in a better quality of translation. Where the relay system 108 is also localized, this also ensures that the bot has immediate, fast access to the individual audio streams which further minimizes any translation delays.

Where additional users participate in a call (in addition to Alice, Bob and the bot itself), call audio streams from these users may also, with separate translations being performed on each audio stream by the bot 402. Where more than two human users participate in a call, the audio streams for all those users may be individually received at the relay system 108 for mixing thereat, thereby also providing convenient access to all those individual audio streams for use by the bot. Each user may then receive a mixed audio stream containing all the necessary translations (i.e. synthetic translated speech for each user speaking a different language to that user). A system with three (or more) users could have each user speaking a different language, where their speech would be translated into both (or more) target languages, and the speech from both (or more) target speakers would be translated into their language. Each user may be presented via their client UIs with the original text and their own translation. For example, User A speaks English, user B Italian and User C French. User A speaks and user B will see English and Italian, whereas User C will see English and French.

In some exiting communication systems, the user who initiates a group call is automatically assigned to host that call, with call audio being mixed at that user's device by default and other clients in the call automatically sending their audio streams to that user by default for mixing. The host is expected to then generate a respective mixed audio stream for each user, the respective audio stream for that user being a mix of all the other participants' audio (i.e. all audio other than that user's own audio). In such systems, a request for the bot to initiate the call will ensure that the bot is assigned as host, thereby ensuring that each other participant's client transmits their individual audio stream to the relay system 108 for mixing thereat by default thus granting access to the individual audio streams to the bot by default. The bot then provides a respective mixed audio stream to each participant which not only includes the audio of the other human participants but also any audio (e.g. synthesised translated speech) to be conveyed by the bot itself.

In some bot-based implementations, the client software may be modified (in particular the client graphical user interface may be modified) to disguise the fact that a bot is performing the translation. That is, from the perspective of the underlying architecture of the communication system, the bot appears substantially as if they were another member of the communication system to enable the bot to be seamlessly integrated into that communication system without modification to the underlying architecture; however this may be hidden from users so that the fact that any in-call translations which they are receiving are being conveyed by a bot who is a participant in the call (at least in terms of the underlying protocols) is substantially invisible at the user interface level.

Whilst the above is described with reference to a bot implementation—that is, with reference to a translator agent that is integrated into the communication system 100 by associating that agent with its own user identifier such that it appears as a regular user of the communication system 100—other embodiments may not be bot implemented. For instance, the translator relay 108 may instead be integrated into a communication system as part of the architecture of the communication system itself, with communication between the system 108 and the various clients being effected by bespoke communication protocols tailored to such interactions. For example, the translator agent may be hosted in a cloud as a cloud service (e.g. running on one or more virtual machines implemented by an underlying cloud hardware platform).

That is, the translator could e.g. be a computer device/system of such devices running a bot with a user identifier, or a translator service running in the cloud etc. Either way, call audio is received from the source user, but the translation is sent directly to the target user from the translator system (not relayed through the source user's client) i.e. in each case, the translator system acts as an effective relay between the source and the target users. A cloud (or similar) service could for instance be accessed from directly from a web browser (e.g. by downloading a plugin or using plugin-free in-browser communication e.g. based on JavaScript), from a dedicated software client (application or embedded), by dialing in from a regular telephone or mobile etc.

A method of delivering a translation of a source user's speech to a target user will now be described with reference to FIGS. 6, 7A-E and 8.

Figure 8:
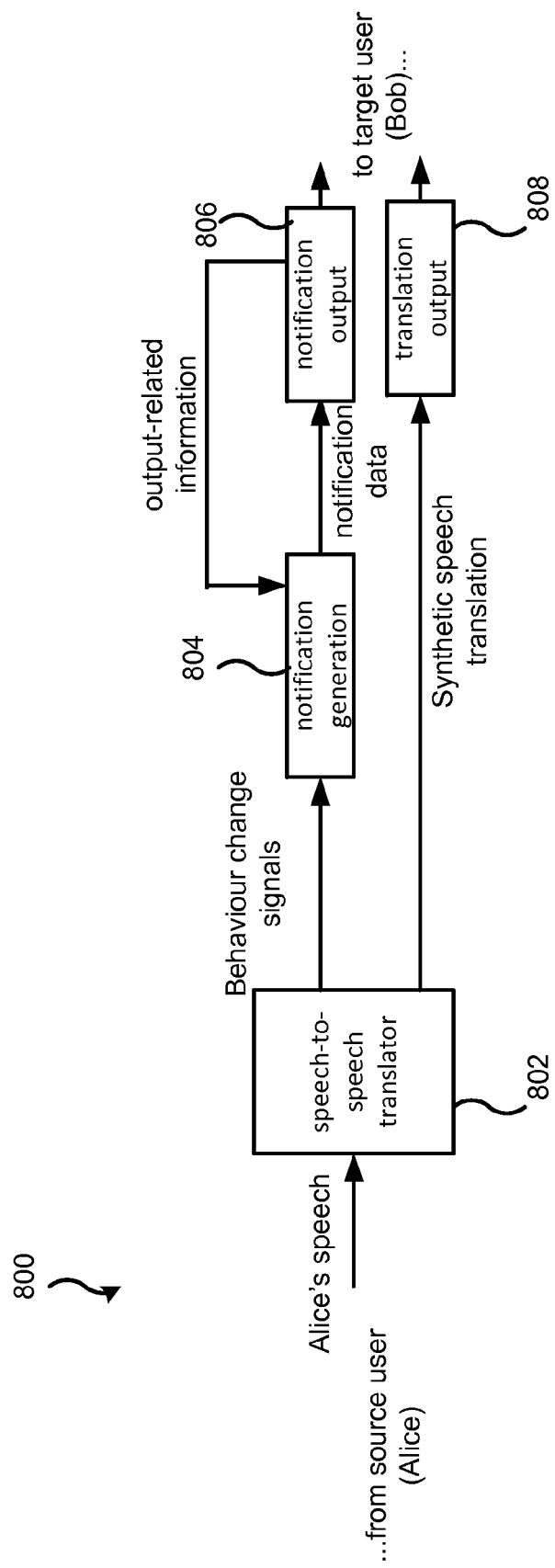
FIG. 8 is a function block diagram of a notification-based translation system.

FIG. 8 shows a notification-based translation system 800 comprising the following functional blocks (components): a speech-to-speech translator (S2ST) 802 (which may implement similar functionality as the S2ST system formed of components 404 and 410 in FIG. 4A/B) which performs a speech-to-speech translation procedure to generate synthetic translated speech in the target language from Alice's call audio which comprises Alice's speech in the source language to be thus translated, and a notification generation component (notification component) 804 configured to generate one or more notifications, separate from the translated audio itself, for outputting to the target user which convey changes in the translation behaviour (that is a change in the nature of the translation-related operations performed in providing an in-call translation service) of the translation procedure when detected by the notification component. These components represent functionality implemented, for instance, by executing code 110 on the translator relay 108 (or by executing code on some other back-end computer system), by executing client 118*a* on device 104*a*, by executing client 118*b* on device 104*b*, or any combination thereof (i.e. with the functionality distributed across multiple devices). In general, the system 800 can be implemented by any computer system of one or more computer devices in a localized or distributed fashion.

The translation procedure outputs the audio translation as an audio stream which is outputted to the target user via the target device loudspeaker(s) as it is outputted by the translation procedure (e.g. being streamed to the target device via the network when translated remotely or streamed directly to the loudspeaker(s) when translated locally). Thus the outputting of the audio translation by the translation procedure is substantially contemporaneous with the outputting of that translation at the target device (i.e. with the only significant delays being those introduced as a result of latency in the network and/or at the target device etc.)

In addition, the system 800 comprises a notification output component 806 and a translation output component 808 which are separate from another (receiving separate and different inputs) implemented at the target user device 104*b* and which represent functionality implemented by executing the client 118*b* at the target user device 104*b*. Components 806 and 808 receive (from components 804 and 802 respectively) and output to the target user the generated notification(s) and the translated audio (which is output via loudspeaker(s) of the target device) respectively. The notification(s) (resp. translated audio) may be received via the network 106 where the notification generation component 804 (resp. translator 802) is implemented remote from the target user device (e.g. at the source device and/or a server etc.), or locally if the notification generation component 804 (resp. translate 802) is implemented on the target device itself.

The speech-to-speech translator has an input connected to receive Alice's call audio (e.g. via the network 106, or locally where the component 802 is implemented at Alice's device), a first output connected to an input of the translation output component 808 for the purposes of delivering the translated audio to Bob (e.g. via the network 106, or directly to Bob's loudspeaker when implemented at Bob's device), and a second output connected to a first input of the notification component 804. This second output communicates signals to the notification component that signal changes in the behaviour of the translation procedure (e.g. via the network 106 when those components are implemented at different devices, or by way of local e.g. internal signalling when implemented on the same device). The notification generation component has an output connected to an input of the notification output component 806, which input causes the aforementioned notification be outputted to Bob (by the notification output component) to notify him when such changes are detected. The notification component has at least one first output connected to a respective at least one output device (display, loudspeakers, and/or other output device) of the target user device 118*b* for outputting the notification(s). The translation output component 808 has an output connected to the loudspeaker(s) of the target user device 104*b* for outputting the audio translation.

In addition, the notification output component 806 has a second output connected to a second input of the notification component, which supplies output-related information about the manner in which the notification(s) are to be outputted at the target user device for use in generating the notifications. That is, the notification output component 806 feeds back information to the notification generation component 804 about the manner in which the notification(s) is/are to be outputted at the target device, which the notification generation component uses to determine how the notifications are generates. Thus, the manner in which the notification(s) are generated may depend on the manner in which they are actually going to be outputted at the device. This information may be fed back remotely via the network 106 where the notification generation component 804 is implemented remotely, or the feedback may be a localized (internal) process at the target device where the notification generation component 804 is implemented locally at the target device.

In the case of visual notifications to be displayed on the display of the target device, the output-related information comprises layout information conveying how the output notifications are going to be positioned in the available area of the target device display.

In the examples described below, the notification component 804 generates synthetic video data of an animated "avatar" for display Bob's on user device (which may be transmitted over the network 106 or communicated directly to the display when the component 804 is implemented at Bob's device. In these examples, the notification component 804 generates a synthetic video of the animated avatar, which video embodies the notification(s)—e.g. as a change in the visual behaviour of the avatar. The layout information comprises information about where the avatar video is going to be displayed on the target device available display area during a video call relative to displayed videos of the target user (Bob) and/or source user (Alice) for use in determining visual behaviour of the avatar.

Figure 6:
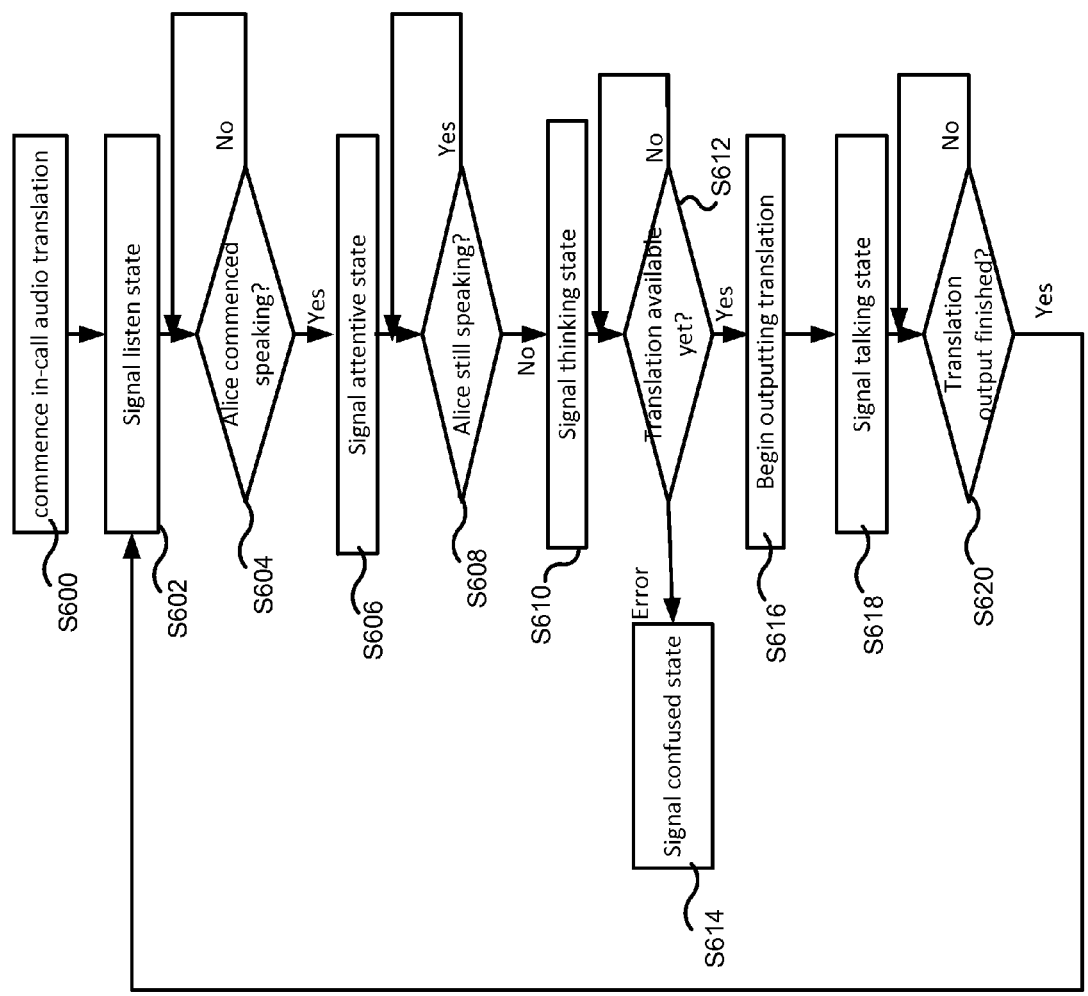
FIG. 6 is a flowchart for a method of operating a translator avatar to be displayed at a client user interface.

FIG. 6 is a flow chart for the method. The method of FIG. 6 is performed during, and as part of, an established voice or video call between a source user (e.g. Alice), using a source user device (e.g. 104*a*), and a target user (e.g. Bob), using a target user device (e.g. 104*b*), in which a translation procedure is performed on call audio of the call, the call audio comprising speech of the source user in the source language, to generate an audio translation of the source user's speech in the target language for outputting to the target user. The translation procedure may be performed at a translator relay in the manner described above, or it may not be and may e.g. be performed at one of the user devices or at some other component of the system (e.g. a server which performs the translation procedure but does not act as a relay e.g. which returns the translation to the source user device for indirect transmission to the target user device). The method is a computer implemented method implemented by suitably programmed code when executed—e.g. the code 110 when executed on the processor 304 of FIG. 3 and/or the client code of the client 118*a* and/or 118*b*. That is, the method may be performed in any suitable communication system for effecting a voice or video call between a source user speaking a source language and a target user speaking a target language implementing some form of in-call speech to speech translation procedure for generating synthetic, translated speech in the target language for outputting to the target user.

In a speech-to-speech translation involving such a speech-to-speech translation procedure, the overall translation procedure may work as follows: a source user e.g. Alice is talking in their own (source) language—the system recognize the voice, translates s it, and sends the text to speech translation to the listener. When supported by video, there may be a delay (e.g. up to a few seconds) between when the other person stops talking and the translated audio is sent. This creates a lot of confusion, making it difficult for the listener to understand when it is safe start talking without interrupting their conversation partner.

In other words, Alice's speech is typically made up of intervals of speech activity—in which Alice is speaking in the source language—interspersed with intervals of speech inactivity in which Alice is not talking e.g. because she is waiting for Bob to speak or because she is currently listening to what Bob is saying.

To this end, the method comprises signalling a change in the behaviour of translation procedure, the change relating to the generation of the translation, and thereby causing a notification to be outputted to the target user to notify the target user of the change when detected. The signalling may be remote via network 106 (if the translation procedure is not performed at the target device). There may also be some benefit to the same or similar notification being outputted to the source speaker as well—e.g. if they see that the translation component is busy performing the translation, they may pause, allowing their interlocutor to catch up, before continuing with the rest of what they are saying.

In the example below, possible signalled changes in behaviour include the procedure entering:

a "listening" ("wait") state, in which it is not currently generating or outputting any translation, for instance, because it has nothing to translate (e.g. entered when it has finished translating all the speech in the most recent interval of speech activity by Alice, and Alice is still in an interval of speech inactivity i.e. has not resumed speaking yet so the procedure has nothing to do at that point);

an "attentive" ("passive translation") state" in which Alice is currently speaking and the procedure is monitoring (i.e. listening to) that speech for the purpose of translating it (e.g. entered from the listening state when Alice resumes speaking)—it may also be generating a provisional, partial translation at this point (see above);

a "thinking" ("active translation") state, in which Alice may not be currently speaking but was speaking sufficiently recently for the procedure to still be processing her most recent speech for the purpose of translating it (e.g. entered from the attentive state when Alice stops speaking);

a "talking" ("outputting") state in which the generated audio translation is currently being outputted (e.g. entered upon reaching a point at which that becomes possible e.g. when the procedure has just finished generating a translation of the Alice's speech spoken during the most recent interval of speech activity by Alice).

a "confused" ("error") state, in which the procedure is currently unable to proceed e.g. because it has been unable to perform a translation of speech or some other error has occurred (entered at the point such an error is recognized).

In particular embodiments, with access to Bob's video stream (not illustrated in FIG. 4A/B), the Bot can take on the persona of a "talking head" avatar, which is animated such that it is obvious when it is talking, listening (waiting), etc. An avatar is a graphical representation, generated artificially, of an animated character e.g. able to be animated to convey meaning through visual cues such as facial expressions, body language, other gestures etc. Here, the behaviour of the avatar is controlled to match the behaviour of the translation procedure—that is, the avatar effectively mimics the visual cues of a real human translator (when performing turn-based translation) or interpreter (when performing continuous translation), thus providing an engaging and intuitive user experience for the target user, as well as making the information the avatar is attempting to convey readily comprehensible to the target user. For instance, in a conversation with a human translator the listener would pay attention to the translator until they are done and then start talking; by way of the aforementioned signalling, the avatar can be made to mimic this behaviour by causing it to adopt a visual pose that indicates they are listing to Alice when the procedure enters the attentive state, and by causing its lips to move upon the translation procedure entering the talking state to coincide with the commencement of the outputting of the audio translation.

Thus, the avatar behaves like a human translator and provides visual cues. For example, a visual cue to indicate to the listener when it is safe start talking by adopting a listening pose upon entering the listening state. Thus, the target user's client may output via the loudspeaker components an audible translation in the target language of the source user's speech during that interval (i.e. a translation portion of translated speech corresponding to the source speech in that interval), and output to the target user an indication (notification) when the outputting of that audible translation (i.e. that translation portion) has substantially finished to indicate that the target user is free to respond to the source user. Here, "substantially finished" includes any point in time sufficiently close to the finishing of the outputting such that it is safe for Bob to start talking without interrupting the natural flow of conversation.

As will be apparent, the changes in state of the translation (turn-based) procedure mentioned above in fact closely mirror actual changes in the mind-set of a human translator or interpreter (contemporaneous translation) in a real-life live translation or interpretation scenario. That is, just as an automated procedure will operate in a listening, waiting, attentive, talking, or confused, so too may the mind-set of a real-life human being doing the same thing. This is exploited by configuring the avatar to approximate various actions expected to be performed by a human translator when communicating a change in their state-of-mind in a real-life translation scenario, that change corresponding to the change in the behaviour of the translation procedure. This is explained in more detail below with reference, in particular, to FIGS. 7A-E which illustrate visual behaviour of the avatar.

The avatar may for instance be a representation of a human, animal, or other character having at least one visual characteristic (e.g. facial feature(s), body part(s), and/or approximations thereof) that can be adapted to convey visual cues in a manner that at least partially mimics expected human behaviour of a human translator.

In a three party video conversation with bot-based speech to speech translation, where the bot is integrated into an existing communication system, there may be two videos and one picture shown on screen by 'default' (because the communication system will simply treat the bot as if they were another user who happens not to have video capabilities but has a static picture associated in the communication system with its username): the video of the caller, the video of the person called and a static picture representing the translation bot.

For example, in a video based speech to speech translation system (S2ST) including video the UI of Bob's client might show the video of the far-end user (Alice), the video of the near-end user (e.g. in a smaller portion of the available display area than the video of Alice) and, by default, some picture associated with the bot's username e.g. an automated bot static graphic. When Alice talks in her own language Bob can visually see the movement of Alice's lips and wait until Alice is done talking. Then the translator bot processes the audio (recognition and translation) and starts speaking Bob's language. During that time the caller would have no visual clue if and when the translation procedure is complete and it is safe start talking. This is liable to generate confusion for Bob.

In accordance with particular embodiments, the idea is to effectively replace the picture of the translator bot with an avatar, thereby enabling:
use of an avatar for speech to speech translation systems
gestures of the avatar to mimic what a human translator or interpreter would do That is, to avoid such confusion, replace the static picture is replaced with an avatar, which visually behaves like a human translator. This can be effected, for example, by transmitting a video stream of synthetically generated video (generated in the manner described below) from the bot to the target user as if it were a video stream from another human user on the video call, and which will be automatically displayed via the client user interface automatically (which would need no modification to the client software and would be compatible with legacy clients). Alternatively, the video can be generated at the target device itself but nevertheless displayed as if it were incoming video from another user (which may need some modification to the client software but which would more efficient in terms of network resources as it would not need the avatar video to be transmitted via the network 106).

FIGS. 7A-E illustrate the display of Bob's user device 104b at various points during the video call. As shown, at each of these points Alice's video 702 as captured at her device 104a is displayed in a first portion of the available display area alongside the synthetic avatar video 704 which is shown in a second portion of the available display area (first and second portions being of similar size), with Bob's video 706 captured at Bob's device 104b (and also transmitted to Alice) shown in a third portion of the available display area, below the avatar video 704 (the third portion smaller than the first and second portions in this example). In this example, the avatar has an approximately human-male form for the purposes of illustration.

Returning to FIG. 6, at step S600 of FIG. 6, the in-call translation procedure commences. The in-call translation procedure is such that Alice's speech is translated from the source language into synthetic speech in the destination language for outputting to Bob during, and as part of, a voice or video call in which at least Alice and Bob are participating.

Figure 7A:
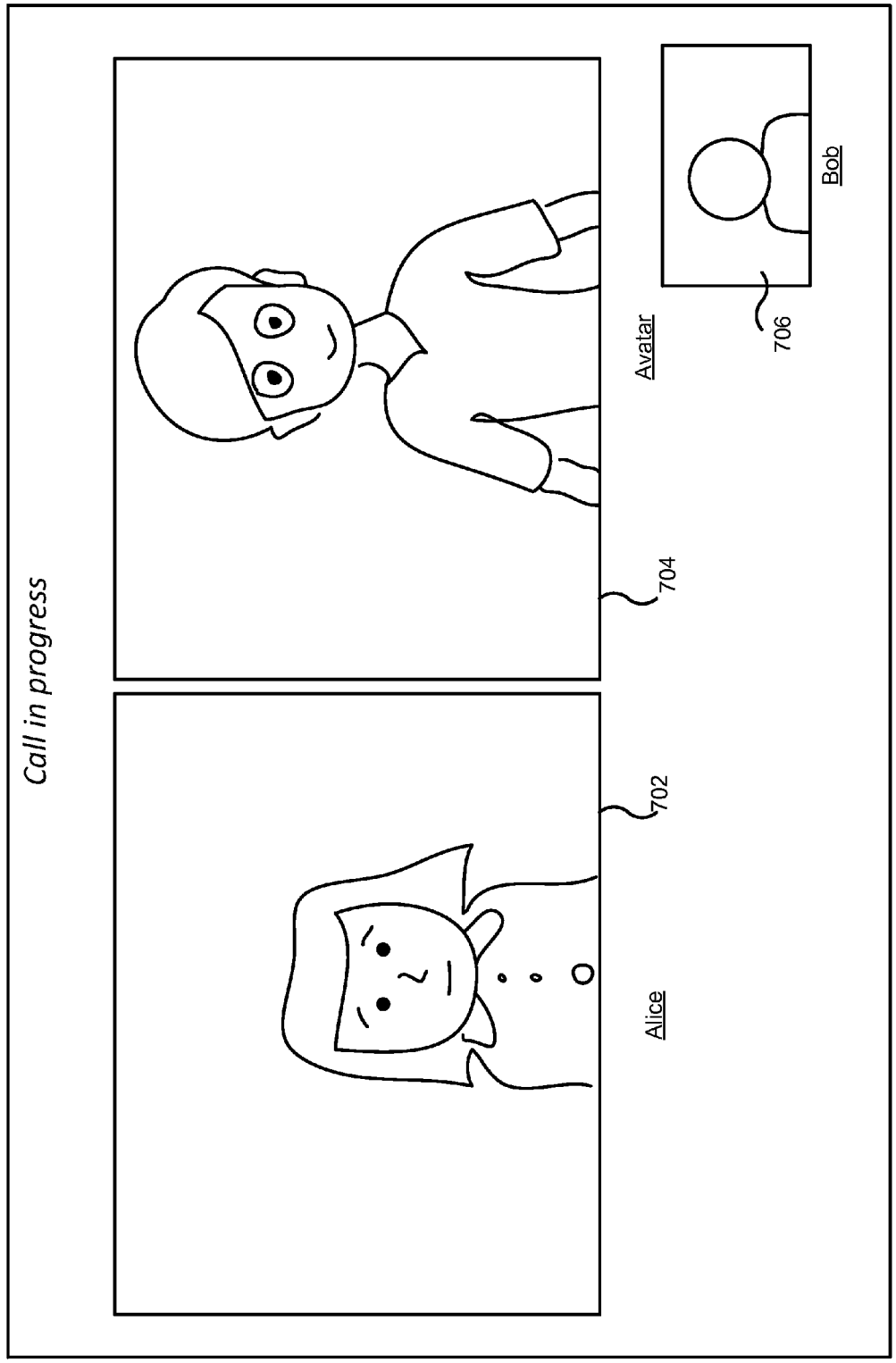
FIGS. 7A to 7E schematically illustrate translator avatar behaviour in various exemplary scenarios.

In this example, the translation procedure begins in the "listening" state which is signalled to the notification component 804 (S602). In this case, the avatar is controlled by the notification component 804 in the synthetic video to adopt a listening pose as illustrated in FIG. 7A.

At step S604, the translator component detects whether or not Alice has commenced speaking e.g. by monitoring the call audio received from Alice and performing Voice Activity Detection (VAD) thereon. The avatar remains in the listening pose for as long as the translation procedure remains in the listening state, which will be the case until Alice starts speaking. When it is detected that Alice has commenced speaking, the translator 802 signals to the notification component 804 that the translation procedure has entered the "attentive state" (S606) e.g. in which it is monitoring Alice's speech for the purposes of eventually translating it, commencing preparations for translation it, or performing a partial translation of that speech which may be subject to modification once more speech is received (as the later speech may provide context that influences the recognition or translation of the earlier speech). In response, the notification component controls the avatar behaviour to adopt visual listening behaviour e.g. so that when the far-end user is talking the avatar pays attention to Alice e.g. by turning turn his/her/its face towards Alice's video. This is illustrated in FIG. 7B.

Figure 7B:
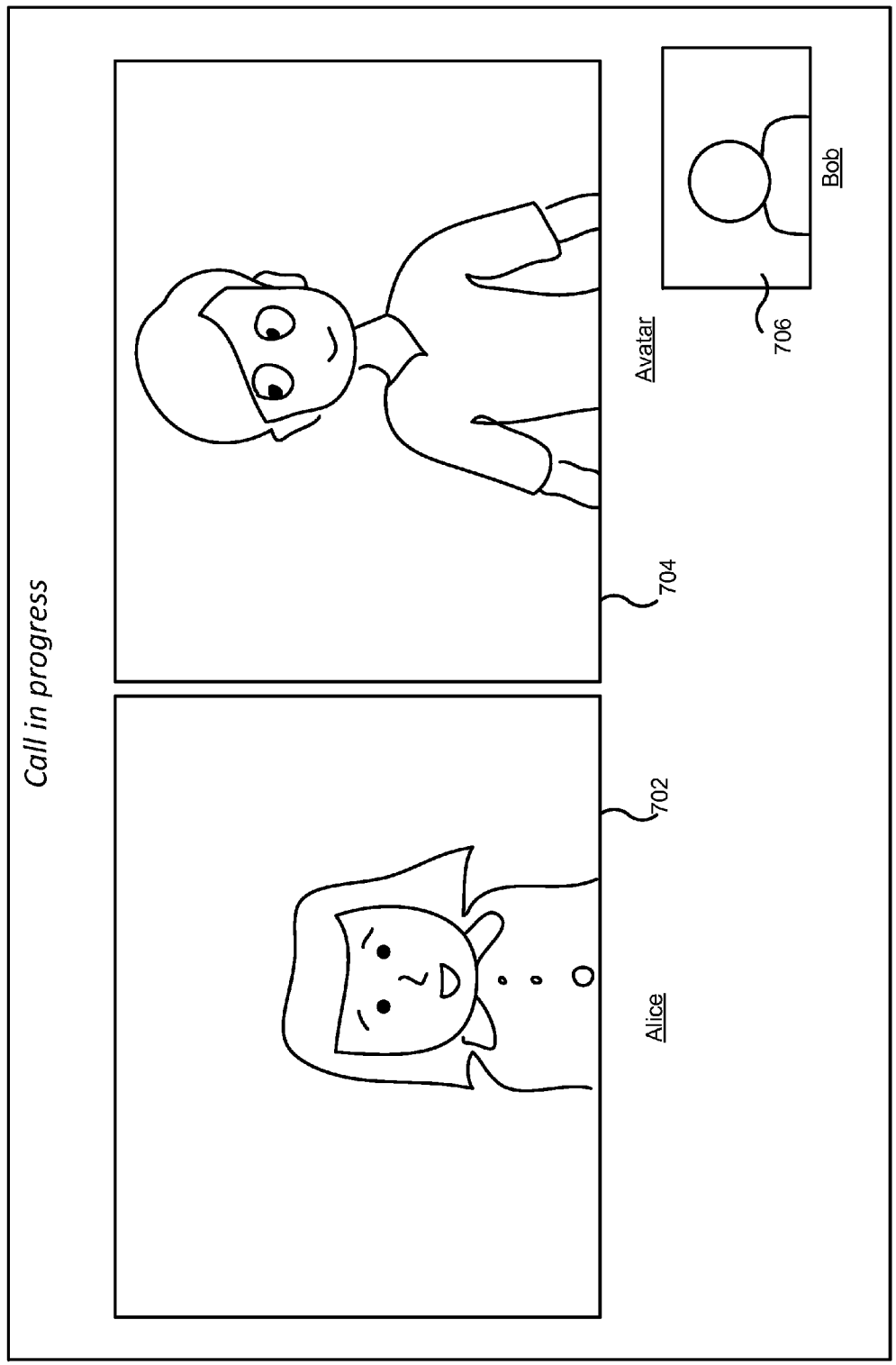

FIG. 7B illustrates one example in where fed-back layout information relating to the relative positions of Alice and the avatar's videos on the available display area of the target device can be used to influence the generation of the avatar video itself. In the example of FIG. 7B, the avatar video is displayed to the right of Alice's video—layout information conveying this relative positioning is fed-back from the notification output component 806 to the notification generation component 804. Based on that information, the notification generation component 804 controls the avatar video upon the translator entering the "attentive" mode to move the avatars eyes to left, thereby ensuring that they are directed towards the display portion in which Alice's video is displayed on the target device to give the impression of the avatar looking at Alice and paying attention to her. Thus, the layout related information is used to make the user experience more natural for Bob by making the avatar behaviour natural and intuitive.

Figure 7C:
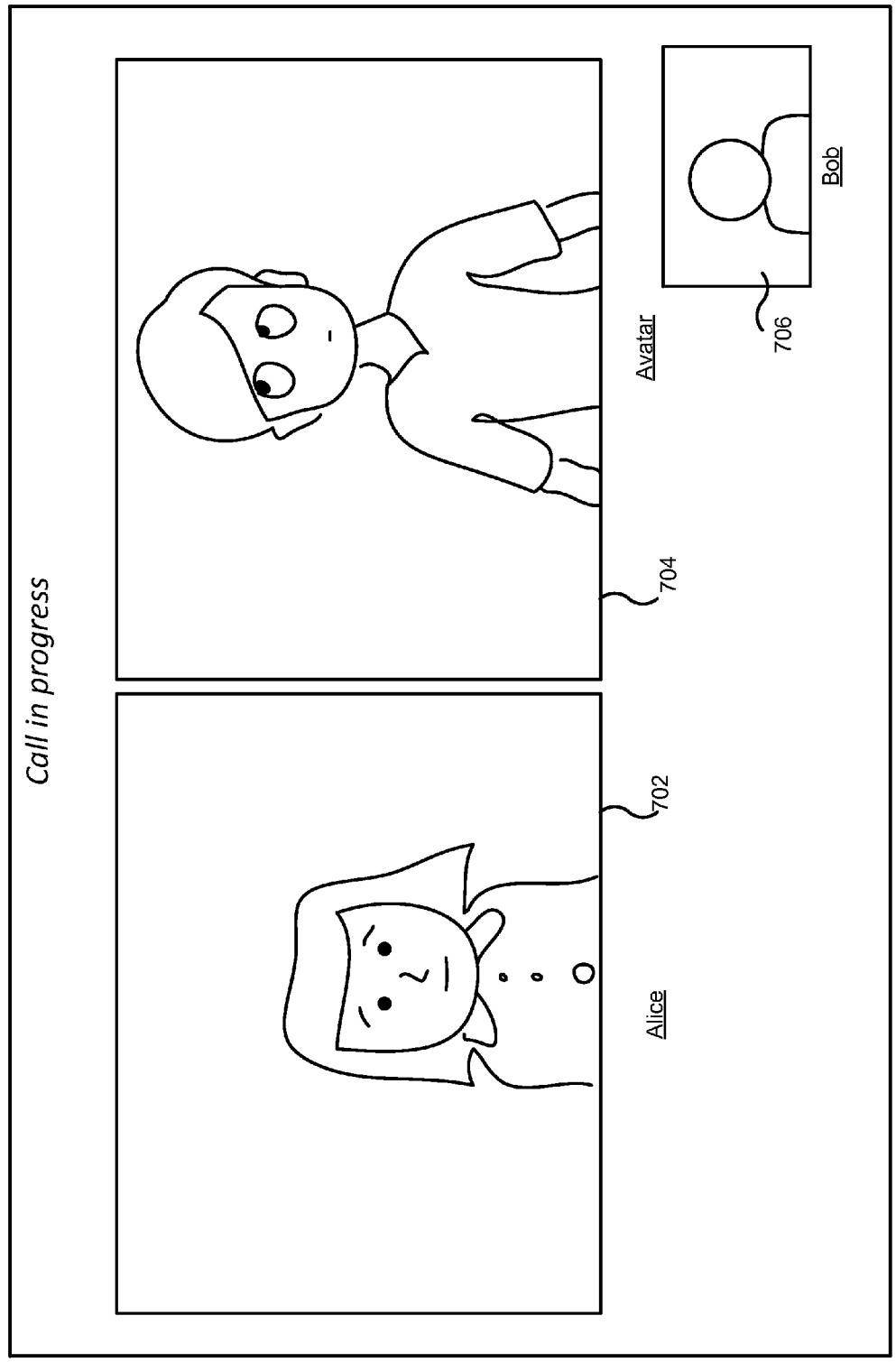

At step S606, it is determined whether or not Alice is still speaking (that is, whether or not she has paused for a sufficient (e.g. predetermined) amount of time since the commencement of her most recent interval of speech activity) e.g. using the VAD. For as long as Alice is still speaking, the translation procedure remains in the "attentive" state and the avatar thus continues to exhibit the listening behaviour. When Alice does stop speaking, the translation procedure enters the "thinking" state during which it performs processing for the purposes of outputting the final audio translation of the most recent interval of speech by Alice. This is signalled to the notification component (S610) and, in response, the notification component causes the avatar to adopt visual behaviour to convey actions of thought e.g. the avatar could adopt a thinking pose, for example putting his hand near his chin or by mimicking a thinking face—this is illustrated in FIG. 7C.

Figure 7D:
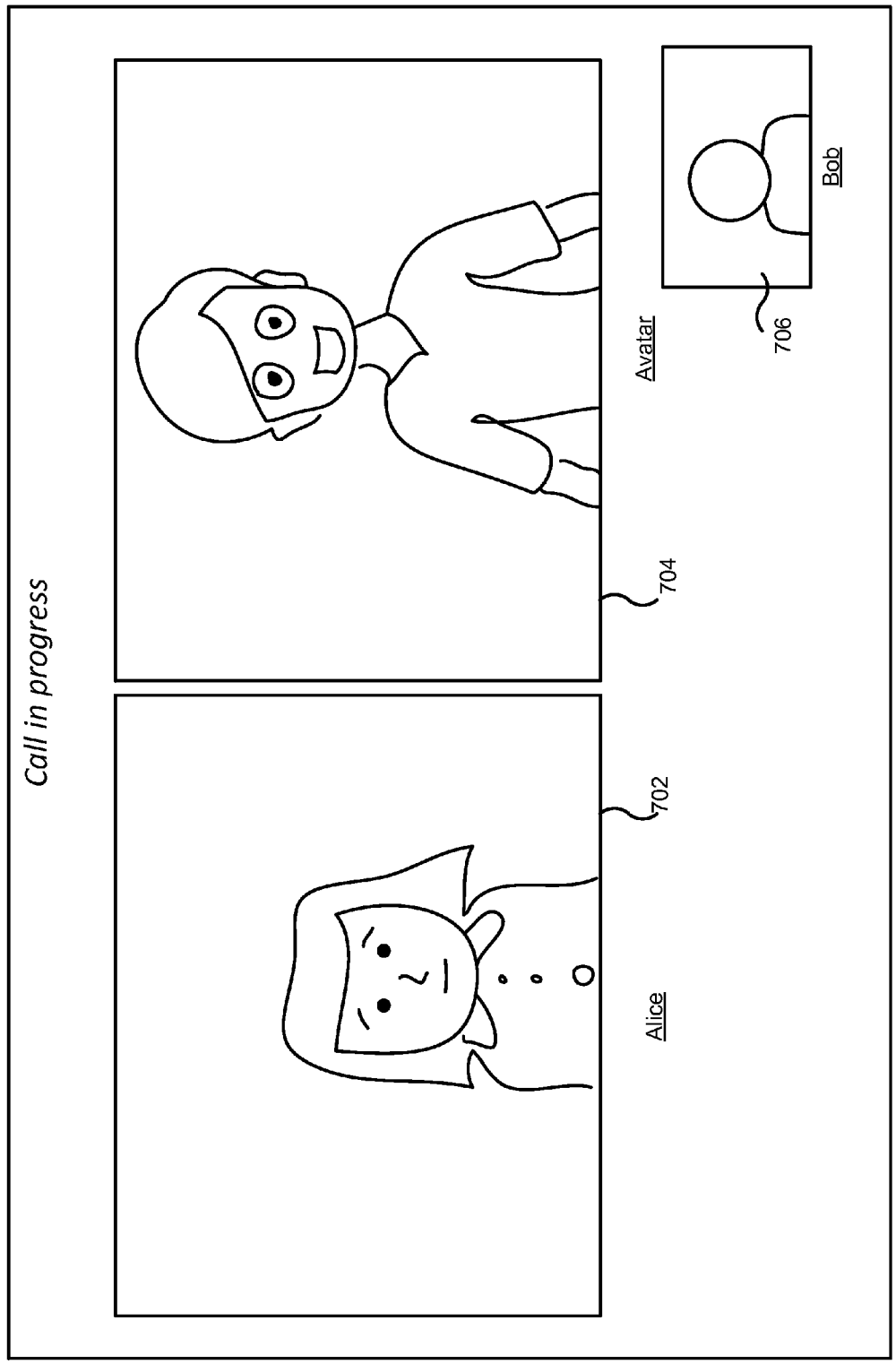

The avatar remains in the pose whilst the translation procedure is performing the processing; when the processing is complete, the translation process enters the "talking" state and begins outputting the now-ready translated audio (see S610). This is signalled at step S616, and in response the avatar is controlled to adopt a speaking visual state e.g. when speaking the translation the avatar could pay attention (turn his face toward) to the near-end user (i.e. look directly out of the display) and show lips speaking (that is, lip movement). This is illustrated in FIG. 7D. The avatar remains in this state for as long as the translator remains in the talking state (i.e. for as long at the translated audio is being outputted); upon completion of said outputting, the translator renters the listening state (see S620).

Figure 7E:
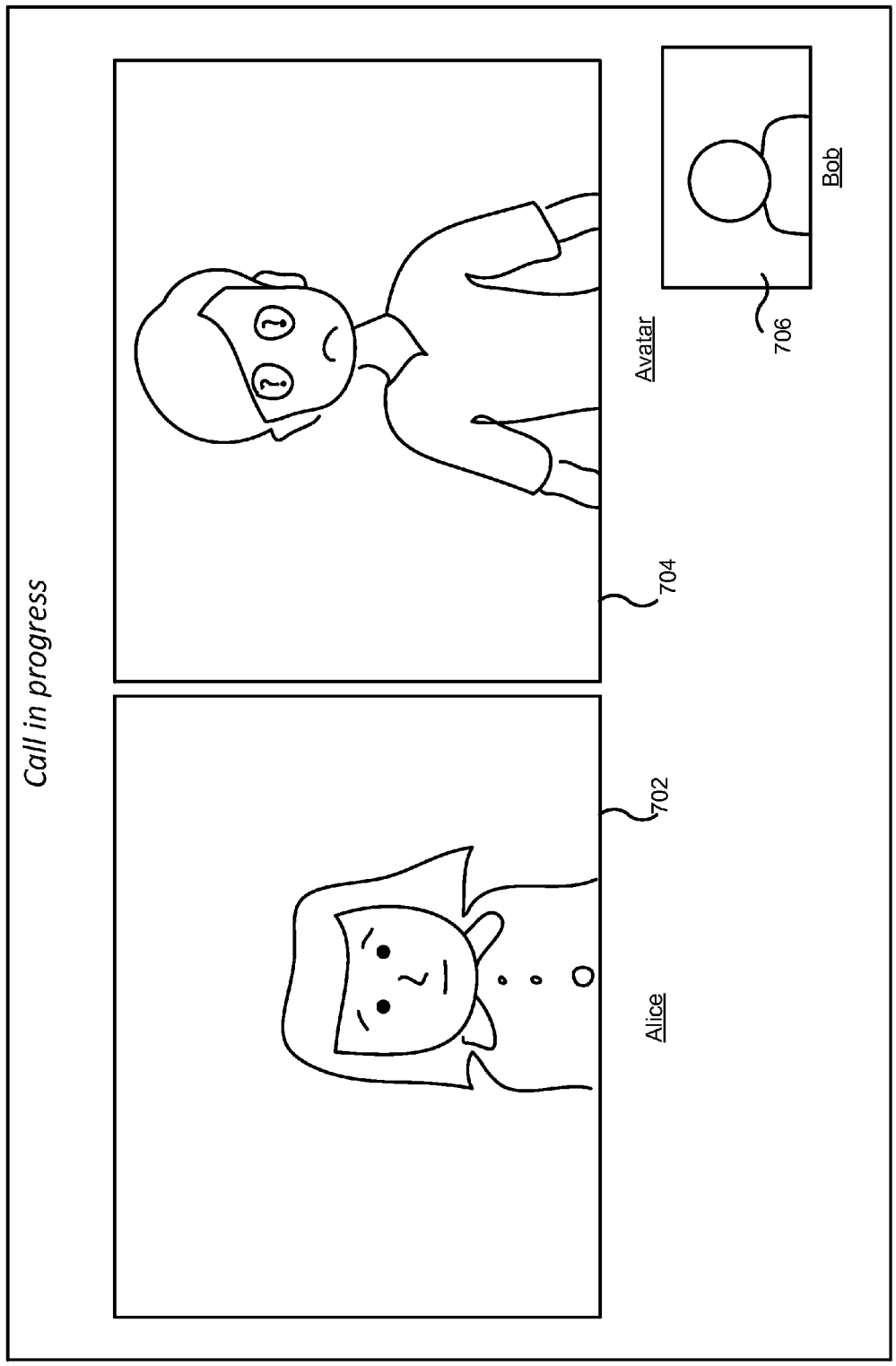

If something goes wrong during the processing, this translator enters the "confused" state, which is signalled to the notification component (S614). In response, the avatar is controlled to enter a confused visual state e.g. by scratching his head or some other visual state of confusion. This is illustrated in FIG. 7E. In addition, when the avatar is also displayed at Alice's device, the avatar may "ask" Alice to repeat (i.e. say that again, I am sorry I did not get it, etc.—that is, an audio request may be outputted to Alice in the source language asking her to repeat what she just said.

One piece of information that is thus conveyed by the avatar using visual information is to indicate when the target user is free to start speaking—the point at which the Avatars lips stop moving constitutes a visual indication conveying this.

The avatar behaviour may also be influenced by other behaviour e.g. other events. For example, the notification generation component 804 may also receive information relating to Bob e.g. relating to Bob's behaviour (in addition to receiving information relating to Alice, which in this case is received by way of the information relation to the translation procedure performed on Alice's speech). For instance, Bob's speech may also be analyzed to detect when Bob starts speaking, at which point the avatar can be controller to look at Bob's video 706 as displayed on Bob's display. fed-back layout information relating to the position of Bob's video on his display can also be used to control the avatar behaviour—e.g. in the examples of FIGS. 7A-E, Bob's video is displayed below the avatar's video 704, and based on this the avatar can be controlled to look down when Bob is talking thus appearing to look towards Bob.

Whilst described with reference to a bot, it should be noted that the subject matter described in relation to FIGS. 6, 7A-E and 8 also applies to non-bot-based systems—here the avatar can be configured to behave in the same way, but will be effectively representing some other translation service (e.g. cloud based translation service) rather than a bot (with an assigned user identifier and which thus appears as a user of the communication system) per se.

Moreover, whilst in the above, a notification constitutes a visual notification conveyed by an animated avatar (that is, embodied in the avatar video), the notification can in other embodiments take any desired form e.g. in the form of an icon that changes shape, colour etc. on the display (e.g. by way of an animated representation of a light that switches from red to green when it is safe for Bob to stay speaking), or an audible indication (e.g. a tone or other sonic icon) output via the loudspeakers, or a tactile notification effected by actuating, say, a vibration component which causes physical, tactile vibration of Bob's user device, and/or other mechanical component of that device. Audio and/or tactile notifications may be particularly useful for mobile devices.

As mentioned, whilst the above has been described in relation to one-way translation for simplicity, two-way translation may be performed with separate and independent translations being performed on each individual call audio stream. Further, whilst the above has been described with reference to calls with two human participants, calls between any number (n<2) of human participants are also envisaged with up to n-way translation being performed (e.g. if all n users speak different languages). Separate translations for each of multiple humans may be performed separately and independently from one another during an n-way call on separate audio streams from the different human participants for the benefit (e.g. for transmitting to) of one or more of the other human participants. Further, the translation in the target language may be transmitted to multiple target users who all speak the target language.

References to media (e.g. audio/video) streams (or similar) refer to a transmission of media (e.g. audio/video) via a communication network to a device for outputting at that device as it is received, in contrast to media that is received in its entirety before commencing outputting thereof. For example, where a synthetic audio or video stream is generated, the media is transmitted as it is generated to the device for outputting as it is as it is received (and thus, at times, whilst it is still being generated).

According to another aspect of the subject matter, the disclosure considers a method performed in a communication system in which users are uniquely identified by associated user identifiers, the communication system for effecting a voice or video call between a source user speaking a source language and a target user speaking a target language, the communication system holding computer code configured to implement a translator agent, the translator agent also being uniquely identified by an associated user identifier, thereby facilitating communication with the agent substantially as if it were another user of the communication system, the method comprising: receiving a translation request requesting that the translator agent participate in the call; responsive to receiving the request, including an instance of the translator agent as a participant in the call, wherein the translator agent instance is configured when thus included to cause operations of: receiving call audio from the source user, the call audio comprising speech of the source user in the source language, performing an automatic speech recognition procedure on the call audio, the speech recognition procedure configured for recognizing the source language, and using the results of the speech recognition procedure to provide the target user with a translation of the source user's speech in the target language.

The agent may appear as another member of the communication system (by virtue of its associated user identifier) e.g. in user's contact lists, or the nature of the bot may be hidden at the user interface level.

According to yet another aspect of the subject matter, there is disclosed a computer system for use in a communication system, the communication system for effecting a voice or video call between at least a source user speaking a source language and a target user speaking a target language, the computer system comprising: one or more audio output components available to the target user; a translation output component configured, for at least one interval of source user speech activity, to output via the audio output components an audible translation in the target language of the source user's speech during that interval; and a notification output component configured to output a notification to the target user when the outputting of that audible translation has substantially finished to indicate that the target user is free to respond to the source user.

According to yet another aspect still of the subject matter, a user device comprises: one or more audio output components; a display component for outputting visual information to a target user of the user device; computer storage holding client software for effecting a voice or video call between the target user and a source user of another user device, the source user speaking a source language and the target user speaking a target language; a network interface configured to receive call audio of the call via a communication network, the call audio comprising speech of the source user in the source language during intervals of source user speech activity; one or more processors configured to execute the client software, the client software configured when executed to perform operations of: outputting the received call audio via the audio output components, for at least one interval of source user speech activity, outputting via the audio output components an audible translation in the target language of the source user's speech during that interval, and outputting to the target user an indication when the outputting of that audible translation has substantially finished to indicate that the target user is free to respond to the source user.

Generally, any of the functions described herein can be implemented using software, firmware, hardware (e.g., fixed logic circuitry), or a combination of these implementations.

The terms "module," "functionality," "component" and "logic" as used herein generally represent software, firmware, hardware, or a combination thereof (e.g. the functional blocks of FIGS. 4A, 4B and 8). In the case of a software implementation, the module, functionality, or logic represents program code that performs specified tasks (e.g. the method steps of FIGS. 5 and 6) when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user devices may also include an entity (e.g. software such as the client 118) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system's state and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

In embodiments of the first aspect as set out in the Summary section, the change in the behaviour may be one of:
  the translation procedure entering a listening state, in which it is currently awaiting future speech activity by the source user during a current interval of speech inactivity by the source user.
  the translation procedure entering a passive translation state responsive to the source user commencing a period of speech activity, in which the translation procedure is monitoring current speech activity by the source user in the call audio.
  the translation procedure entering an active translation state responsive to the source user finishing an interval of speech activity, in which the translation procedure is currently generating an audio translation of the source user's speech in that interval to be outputted when that generating is complete.
  the translation procedure entering an outputting state responsive to the translation procedure completing generation of an audio translation of the source user's speech during a preceding interval of source user speech activity, in which that generated audio translation is currently being outputted by the translation procedure for outputting to the target user.
  the translation procedure entering an error state responsive to the procedure encountering an error in generating the translation.

The translated audio may be transmitted via a communication network as it is generated to a target device of the target user for outputting via one or more audio output components of that device as it is received.

Synthetic video may be generated in dependence on the signalled change in the behaviour, the synthetic video for displaying at a target user device of the target user and embodying the notification. The synthetic video may be of an animated avatar performing visual actions, the notification embodied as a visual action by the avatar. The embodying action may approximate an action expected to be performed by a human translator or interpreter when communicating a change in their state-of-mind in a real-life translation or interpretation scenario, that change corresponding to the change in the behaviour of the translation procedure.

The notification may comprises a visual notification for displaying at a target user device of the target user and/or an audio notification for playing out at the target user device and/or a tactile notification outputted by actuating a mechanical component of the target user device.

In embodiments of the second aspect, the call audio may comprises speech of the source user in the source language during intervals of source user speech activity interspersed with intervals of speech inactivity in which the source user is not speaking; for at least one interval of source user speech activity, the translation output component may be configured to output via the audio output components an audio translation of the source user's speech during that interval, and the notification output component may be configured to output the notification when the outputting of that translation has substantially finished to indicate that the target user is free to respond to the source user.

The computer system may be embodied by a target user device of the target user or by a combination the target user device and at least one other computer device to which the target user device is connected via a communication network.

The computer system may comprise an input configured to receive a signal signalling the change in the behaviour of translation procedure; and a notification generation component configured to generate the notification in dependence on the received signal.

The notification output component may be configured to generate output-related information defining the manner in which the notification is to be outputted to the target user; and the notification generation component may be configured to generate the notification in dependence on the output-related information.

The computer system may comprise a display available to the target user, and the notification may comprise a visual notification to be displayed on the display and the output-related information comprises related layout information. The notification generation component may be configured to generate synthetic video embodying the notification, the synthetic video generated in dependence on the layout information. The synthetic video may be of an animated avatar which performs visual actions, the notification embodied as a visual avatar action that is controlled in dependence on the layout information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method performed in a communication system, the communication system for effecting a voice or video call between at least a source user speaking a source language and a target user speaking a target language, the method comprising:
receiving call audio of the call, the call audio comprising speech of the source user in the source language;
performing, by a speech translator module, an automatic translation procedure on the call audio to generate an audio translation of the source user's speech in the target language for outputting to the target user; and
signalling, by the speech translator module, a change in behaviour of the automatic translation procedure, the change relating to the generation of the automatic translation, and thereby causing a notification to be outputted to the target user to notify the target user of the change, the notification corresponding to the change in behaviour of the translation procedure and including a synthetic video embodied as a visual action by an animated avatar mimicking visual cues of a human.

2. The computer-implemented method according to claim 1 wherein the change in the behaviour is the translation procedure entering a listening state, in which it is currently awaiting future speech activity by the source user during a current interval of speech inactivity by the source user.

3. The computer-implemented method according to claim 1 wherein the change in the behaviour is the translation procedure entering a passive translation state responsive to the source user commencing a period of speech activity, in which the translation procedure is monitoring current speech activity by the source user in the call audio.

4. The computer-implemented method according to claim 1 wherein the change in behaviour is the translation procedure entering an active translation state responsive to the source user finishing an interval of speech activity, in which the translation procedure is currently generating an audio translation of the source user's speech in that interval to be outputted when that generating is complete.

5. The computer-implemented method according to claim 1 wherein the change in the behaviour is the translation procedure entering an outputting state responsive to the translation procedure completing generation of an audio translation of the source user's speech during a preceding interval of source user speech activity, in which that generated audio translation is currently being outputted by the translation procedure for outputting to the target user.

6. The computer-implemented method according to claim 1 wherein the change in the behaviour is the translation procedure entering an error state responsive to the procedure encountering an error in generating the translation.

7. The computer-implemented method according to claim 1 wherein the translated audio is transmitted via a communication network as it is generated to a target device of the target user for outputting via one or more audio output components of that device as it is received.

8. The computer-implemented method according to claim 1 wherein the notification comprises a visual notification for displaying at a target user device of the target user and/or an audio notification for playing out at the target user device and/or a tactile notification outputted by actuating a mechanical component of the target user device.

9. A computer system for use in a communication system, the communication system for effecting a voice or video call between at least a source user speaking a source language and a target user speaking a target language, the computer system comprising:
one or more audio output components available to the target user;
a translation output component configured to output an audio translation of the source user's speech in the target language to the target user via the audio output components, the translation generated by performing an automatic translation procedure on call audio of the call which comprises speech of the source user in the source language; and
a notification output component configured to output a notification to the target user to notify the target user of a change in behaviour of the translation procedure, the change relating to the generation of the translation and the notification including a synthetic video embodied as a visual action by an animated avatar mimicking visual cues of a human.

10. The computer system according to claim 9 wherein the call audio comprises speech of the source user in the source language during intervals of source user speech activity interspersed with intervals of speech inactivity in which the source user is not speaking;
wherein, for at least one interval of source user speech activity, the translation output component is configured to output via the audio output components an audio translation of the source user's speech during that interval, and wherein the notification output component is configured to output the notification when the outputting of that translation has substantially finished to indicate that the target user is free to respond to the source user.

11. The computer system according to claim 9 wherein the computer system is embodied by a target user device of the target user or by a combination the target user device and at least one other computer device to which the target user device is connected via a communication network.

12. The computer system according to claim 9 comprising:
an input configured to receive a signal signalling the change in the behaviour of translation procedure; and
a notification generation component configured to generate the notification in dependence on the received signal.

13. The computer system according to claim 12 wherein the notification output component is configured to generate output-related information defining the manner in which the notification is to be outputted to the target user; and
wherein the notification generation component is configured to generate the notification in dependence on the output-related information.

14. The computer system according to claim 13 comprising a display available to the target user, wherein the synthetic video embodied as the visual action is displayed on the display and the output-related information comprises related layout information.

15. The computer system according to claim 14 wherein the notification generation component is configured to generate the synthetic video embodied as the visual action and embodying the notification, the synthetic video generated in dependence on the layout information.

16. The computer system according to claim 15 wherein the animated avatar mimicking visual cues of a human is controlled in dependence on the layout information.

17. A computer program product comprising computer code stored on a computer readable storage device configured when executed on a processor to cause operations of:
- establishing a voice or video call between at least a source user speaking a source language and a target user speaking a target language;
- outputting an audio translation of the source user's speech in the target language to the target user, the translation generated by performing an automatic translation procedure on call audio of the call which comprises speech of the source user in the source language; and
- outputting a notification to the target user to notify the target user of a change in behaviour of the translation procedure, the change relating to the generation of the translation and the notification including a synthetic video embodied as a visual action by an animated avatar mimicking visual cues of a human.

18. The computer program product according to claim 17 wherein the change in the behaviour is the translation procedure entering a listening state, in which it is currently awaiting future speech activity by the source user during a current interval of speech inactivity by the source user.

19. The computer program product according to claim 17 wherein the change in the behaviour is the translation procedure entering a passive translation state responsive to the source user commencing a period of speech activity, in which the translation procedure is monitoring current speech activity by the source user in the call audio.

20. The computer program product according to claim 17 wherein the change in behaviour is the translation procedure entering an active translation state responsive to the source user finishing an interval of speech activity, in which the translation procedure is currently generating an audio translation of the source user's speech in that interval to be outputted when that generating is complete.

* * * * *